United States Patent [19]

Nanba et al.

[11] 4,209,241
[45] Jun. 24, 1980

[54] PHOTOELECTRIC RANGEFINDER

[75] Inventors: Yasuhiro Nanba, Osaka; Nobuyuki Taniguchi, Sakai, both of Japan

[73] Assignee: Minolta Camera Kabushiki Kaisha, Osaka, Japan

[21] Appl. No.: 950,517

[22] Filed: Oct. 11, 1978

[30] Foreign Application Priority Data

Oct. 12, 1977 [JP] Japan .................. 52-122708
Oct. 26, 1977 [JP] Japan .................. 52-129049

[51] Int. Cl.² .................. G03B 3/10; G03B 7/08
[52] U.S. Cl. .................. 354/25; 350/163 SF;
354/31; 354/59; 354/60 L
[58] Field of Search .............. 354/25, 31, 60 E, 60 L,
354/59; 352/140; 355/56; 356/4

[56] References Cited
U.S. PATENT DOCUMENTS

| 4,071,297 | 1/1978 | Leitz et al. ........................ 356/4 |
| 4,090,209 | 5/1978 | Kondo .............................. 354/25 |
| 4,110,042 | 8/1978 | Leitz ............................... 356/4 |
| 4,155,044 | 5/1979 | Schulz ........................... 354/25 X |

FOREIGN PATENT DOCUMENTS 47-27407 7/1972 Japan .

Primary Examiner—Michael L. Gellner
Attorney, Agent, or Firm—Wenderoth, Lind & Ponack

[57] ABSTRACT

A photoelectric rangefinder for use in a photographic camera for automatically focusing an image of a target object on a predetermined image plane. The system utilizes an electro-optical spatial filter having at least two photoresponsive elements to find the difference in phase between output signals from the respective photoresponsive elements. A signal indicative of the difference in phase between the output signals from the photoresponsive elements is used to move a phototaking objective lens along its optical path to reposition the objective lens in search for a true focus setting. The objective lens is brought into proper focus when the signal indicative of the phase difference assumes a predetermined electric relation with an electric signal indicative of the position of the objective lens along its optical axis.

30 Claims, 26 Drawing Figures

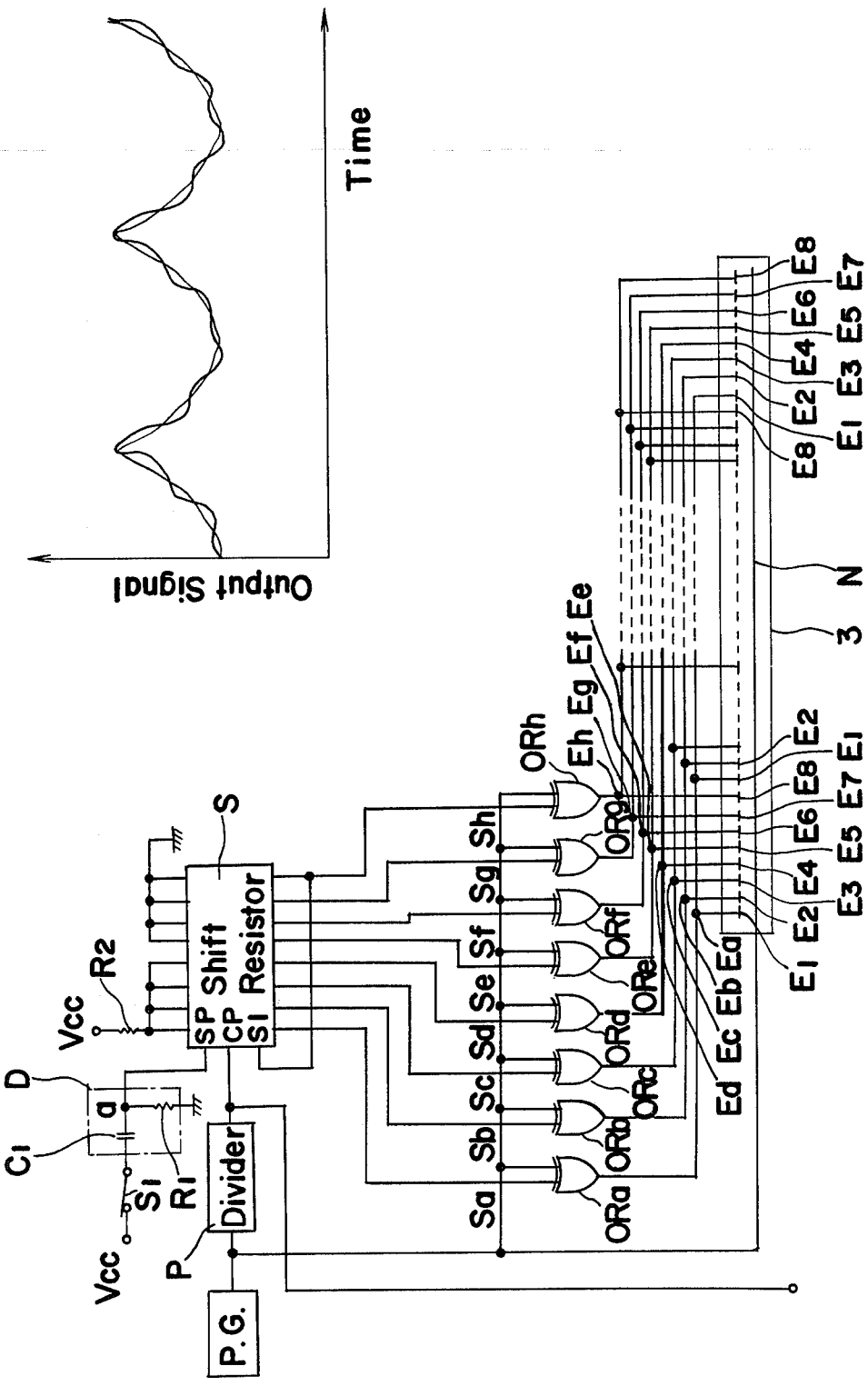

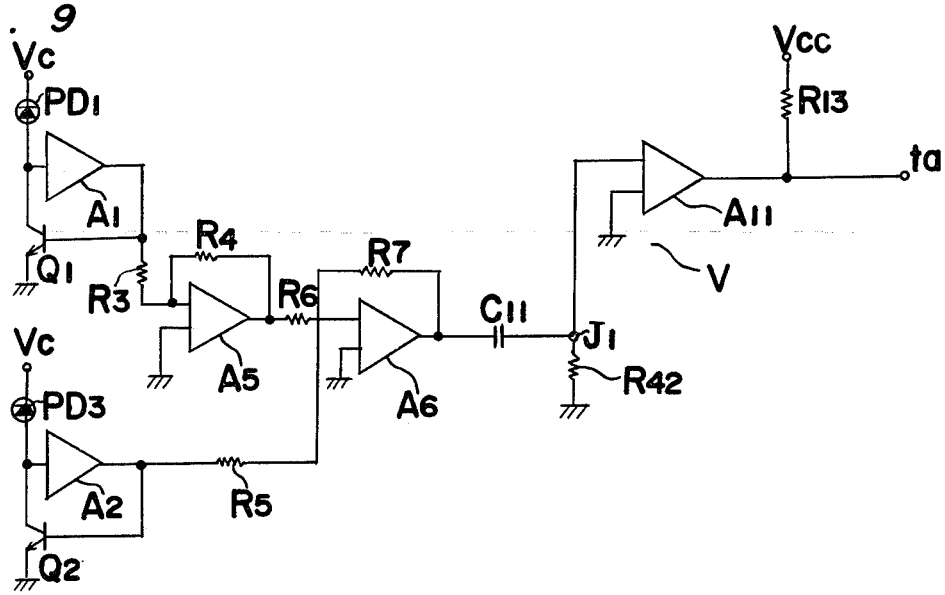
Fig. 9
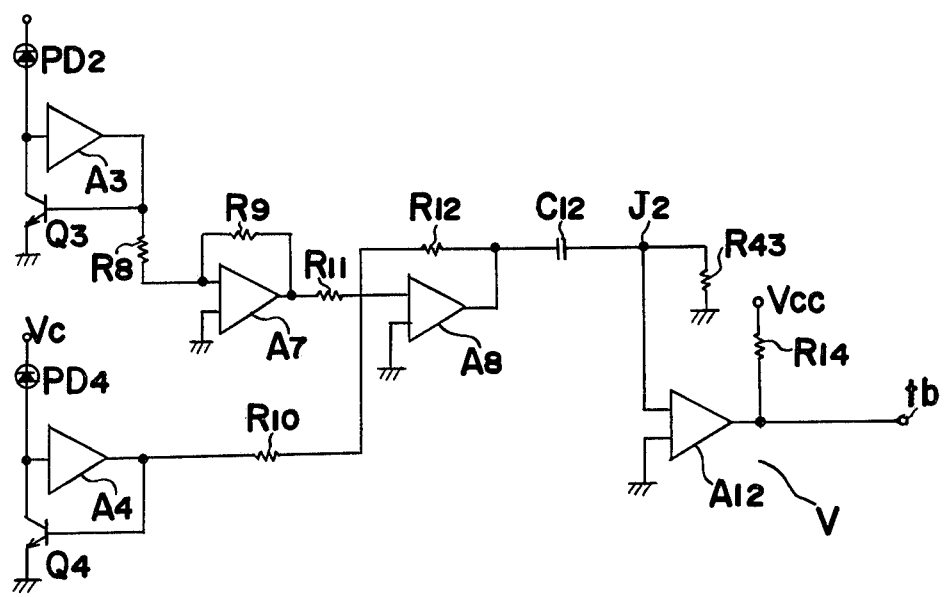
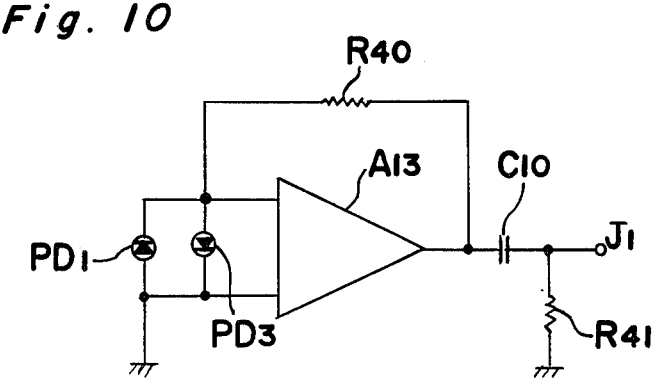
Fig. 10

PHOTOELECTRIC RANGEFINDER

BACKGROUND OF THE INVENTION

The present invention relates to a photoelectric rangefinder for determining the distance of a target object relative to a reference plane.

There is known a photoelectric rangefinder system comprising a pair of photoelectric elements, each capable of generating an electric signal indicative of the intensity of light sensed thereby, a spatial filter supported for movement so as to mechanically scan the image forming plane of an objective lens system, and means for generating an electric signal representative of the difference in phase between the output signals from the respective photoelectric elements which results from the fact that the incident light falling on one of the photoelectric elements and that falling on the other of the photoelectric elements are transmitted thereto from different portions of the target object. This phase difference is indicative of the distance of the target object relative to the image forming plane. This type of photoelectric rangefinder system is disclosed, for example, in German Laid-open Patent Publication No. 2,330,940, Japanese Laid-open Patent Publication No. 48-60645, German Patent Publication No. 2,619,795 and Japanese Laid-open Patent Publication No. 48-81530.

It is a general belief that a rangefinder system designed to be incorporated in a compact photographic camera can operate precisely with a minimum possible consumption of electric power and can be manufactured at a relatively low cost. Despite of this general belief, the conventional rangefinder system of the construction described above includes various disadvantages and inconveniences. By way of example, in order to improve the distance measuring performance of the rangefinder system the spatial filter must scan at a relatively high speed within a tolerance of tens of microns in a direction parallel to the optical axis and also in a direction perpendicular to the longitudinal axis of the parallel slits forming the spatial filter. Employment of a mechanical drive mechanism for achieving this requirement requires a lot of energy and, if an electromagnetic drive unit is employed in place of a mechanical drive mechanism for driving the spatial filter for scanning, the power source usually employed in the photographic camera cannot provide a sufficient amount of electric power necessary to operate the electromagnetic drive unit. Moreover, the rangefinder system tends to become bulky to such an extent as to render the photographic camera bulky and expensive.

Furthermore, in the conventional rangefinder sytem, unless the scanning speed is fixed at a predetermined value, the phase difference in the electric output signals will vary even though the images of respective target objects are equally focused on the same image forming plane, thereby providing an erroneous electric signal.

In the mechanical scanning such as performed by the conventional rangefinder, the slits forming the spatial filter move reciprocately and, therefore, it is difficult to cause the slits to move at a predetermined speed. Yet, in the conventional rangefinder system wherein the spatial filter undergoes a mechanical scanning operation, a precisely positioned mask is required to fix the range of distance measurement. In addition, where the target object has a pattern of finely divided bright and dark areas, the output signals will have a complicated waveform to such an extent that a complicated signal processing circuit is required and, in the worst case, erroneous operation is likely to occur. Moreover, since the conventional rangefinder system employs mechanically movable parts operated at a relatively high speed, the rangefinder system tends to fail to operate properly.

In view of the above, the conventional rangefinder system is bulky and expensive, requiring complicated signal processing circuitry and, therefore, can hardly be practically incorporated into a compact camera.

There is also known a photoelectric rangefinder system comprising fixed and movable lens systems arranged in spaced relation to each other in a plane perpendicular to the optical axis, a slit member positioned on an image forming plane of one of the fixed and movable lens systems for passing of a portion of the rays of light passing through the corresponding fixed and movable lens systems, and a photoelectric detector element positioned behind the slit member. In this known rangefinder system, the slit member is oscillated in a predetermined cycle so that the photoelectric detector element can generate substantially alternating output signals resulting from a partial difference in brightness of a target object. These output signals are subsequently converted into electric signals having a substantially rectangular waveform.

A servo motor for controlling the direction of movement of the movable lens system and the direction of movement of the same movable lens system is controlled by a difference signal indicative of the difference in phase between the signals of the rectangular waveform and an electric signal indicative of the frequency of oscillation of the slit member or the photoelectric detector element. This type of rangefinder system is disclosed, for example, in any one of the Japanese Patent Publications No. 47-6983 and No. 47-27407, both published in 1972.

With this known rangefinder system, in the case where the brightness distribution of the target object is dense, the cycle of the rectangular wave produced by converting the output signal from the photoelectric detector element tends to be shortened to such an extent that the rangefinder system may function erroneously. Moreover, since the slit member or the photoelectric detector element is mechanically oscillated, even this rangefinder system involves such disadvantages as hereinbefore described in connection with the first mentioned known type of rangefinder system.

Furthermore, where the target object is illuminated by a source of illumination having an A.C. or pulsating component, such as noticeable under an artificial lighting condition, the output signals generated from the photoelectric detector element have a noise component superimposed thereon as shown in FIG. 3. Because of this, in the known rangefinder systems not only is the signal processing complicated, but also a complicated and expensive circuit is required.

SUMMARY OF THE INVENTION

Accordingly, the present invention has been developed to substantially eliminate the above described disadvantages and inconveniences inherent in the prior art rangefinder systems and is intended to provide an improved rangefinder system wherein output signals from photoresponsive elements can readily and effectively be processed without requireing the employment of any expensive and complicated circuitry.

Another object of the present invention is to provide an improved rangefinder system of the type referred to above which can be manufactured in a compact size and which can, therefore, be incorporated in a photographic camera without substantially increasing the size of the photographic camera.

A further object of the present invention is to provide an improved rangefinder system of the type referred to above which is reliable in operation and can be readily manufactured at a reasonable cost.

BRIEF DESCRIPTION OF THE DRAWINGS

These and other objects and features of the present invention will become apparent from the following description taken in conjunction with preferred embodiments thereof with reference to the accompanying drawings, in which:

FIG. 3 is the chart showing a waveform of the output signal from one of photoresponsive elements forming the photoelectric receiver unit having a noise component superimposed thereon;

FIG. 4 is a diagram showing a circuit for driving a spatial filter used in the system of FIG. 1;

FIG. 5 is a plan view, on an enlarged scale, showing the construction of the spatial filter;

FIG. 5(A) is a chart illustrating the mode of scanning performed by the spatial filter;

FIG. 9 is a diagram showing an electric conversion circuit for processing output signals from the photoresponsive elements of the photoelectric receiver unit;

FIG. 10 is a diagram showing a modified form of the conversion circuit;

DETAILED DESCRIPTION OF THE INVENTION

Figure 1:
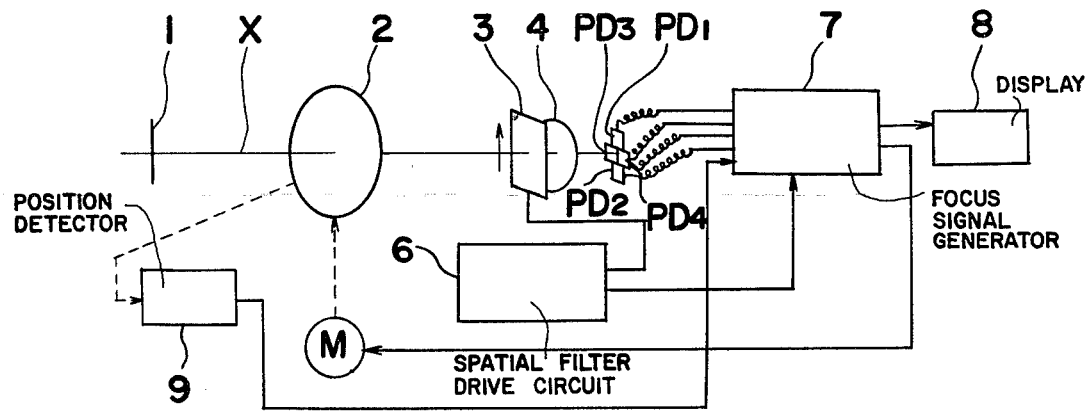
FIG. 1 is a schematic diagram showing a rangefinder system according to a preferred embodiment of the present invention.

Before the description of the present invention proceeds, note that like parts are designated by like reference numerals throughout the accompanying drawings.

Figure 2:
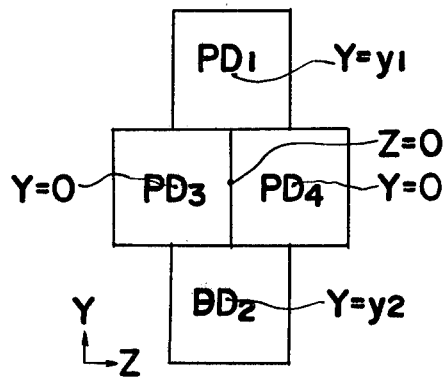
FIG. 2(a) is a front elevational view of the photoelectric receiver unit shown in FIG. 1.
FIGS. 2(b) to 2(d) are views similar to FIG. 2(a), showing modifications of the photoelectric receiver unit.
Figure 2:
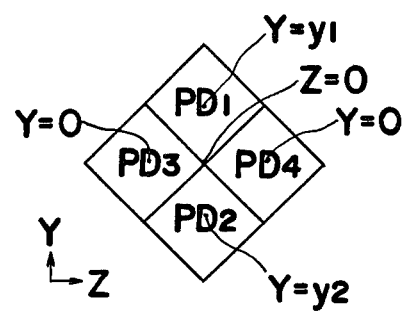
Figure 2:
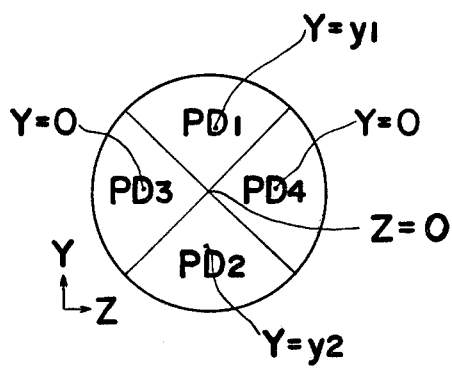
Figure 2:
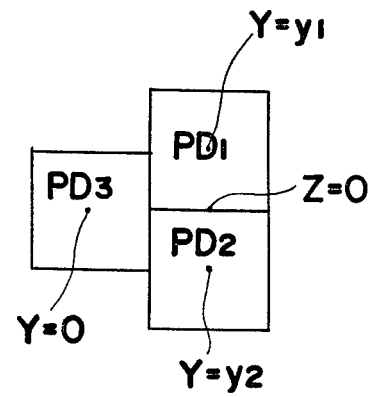

Referring now to FIG. 1, the rangefinder embodying the present invention comprises a photo-taking objective lens 2 adapted to aim at a target object 1 to be photographed and to project an image of the target object on a predetermined image forming plane of the objective lens 2, a spatial filter 3, constructed as will be described later, positioned at the predetermined image forming plane of the objective lens 2, the image scanning operation of said spatial filter 3 taking place in a direction perpendicular to the optical axis of the objective lens 2, a relay lens 4, and a photoelectric receiver unit including two pairs of photoresponsive elements $PD_1$, $PD_2$ and $PD_3$, $PD_4$. The photoelectric receiver unit is designed, as best shown in FIG. 2(a), so that the photoresponsive elements $PD_3$ and $PD_4$ of one pair are positioned in a side-by-side relation to each other while the photoresponsive elements $PD_1$ and $PD_2$ of the other pair are both spaced a predetermined distance from the optical axis X of the objective lens 2 with the photoresponsive element $PD_1$ positioned above the photoresponsive element PD.

The output signals of photoresponsive elements $PD_1$ and $PD_2$ are used to generate a phase difference signal. In particular, the photoresponsive elements $PD_1$ and $PD_2$ are optically positioned so that the first output signal from the photoresponsive element $PD_1$ leads the second output signal from the photoresponsive element $PD_2$ in phase when the image of the target object is in a front focus relationship and that the second output signal leads the first output signal in phase when the same is in a rear focus relationship. The term "front focus relationship" means that the image of the target object is relatively located closer to the target object than the predetermined plane where the spatial filter 3 is located, and the term "rear focus relationship" means the image is further from the target object than the predetermined plane. The predetermined plane also corresponds in position to the focal plane of the photographic camera where a light sensitive film is located.

The photoresponsive elements $PD_3$ and $PD_4$ serve to eliminate such noise components as may be contained in the output signals from the photoresponsive elements $PD_1$ and $PD_2$ under the influence of the flickering of a fluorescent lamp used to illuminate the target object 1, for example, FIG. 3 shows an example of the output signal from the element $PD_1$ or $PD_2$ in such a case, in which a noise signal of relatively great amplitude and relatively low frequency is added to the desirable signal of relatively small amplitude and relatively high frequency. The elements PD$_3$ and PD$_4$ are provided to remove this serious noise.

The rangefinder system further comprises a circuit block 6, containing a filter drive circuit for electrically driving the spatial filter 3 and a pulse generator for generating a train of sync pulses, and a circuit block 7 containing a control signal generator for detecting the deviation of the focused image of the target object from the predetermined image forming plane as sensed by the photoresponsive elements PD$_1$ to PD$_4$ and for generating a control signal indicative of this deviation which is applied to a display unit 8 for displaying this deviation in a form viewable by the operator of the rangefinder system and is applied to an electric motor M used to reposition the objective lens 2 along the optical axis of the objective lens 2 in order to maintain the proper focus of the objective lens 2 at the predetermined image forming plane.

Note that the photoresponsive elements PD$_1$ to PD$_4$ may be arranged such as shown in either of FIGS. 2(b) or 2(c) which, when employed in the rangefinder system, should be positioned so as to align the junction of these photoresponsive elements with the optical axis X of the objective lens 2. Moreover, three photoresponsive elements PD$_1$, PD$_2$ and PD$_3$ disposed as shown in FIG. 2(d) may be used. However, the photoelectric receiver unit illustrated in FIG. 2(d) is positioned so that the center point of the adjoining side edges of the photoresponsive elements PD$_3$ and PD$_4$ located between the photoresponsive elements PD$_1$ and PD$_2$ is aligned with the optical axis of the objective lens 2.

In any event, the phase of the output signal from any of these photoresponsive elements PD$_1$ to PD$_4$ is determined by the center of luminosity of the exit pupil of the objective lens 2 which projects an image of the target object onto the photoresponsive element by way of the spatial filter 3 and the relay lens 4, that is, the center of receptivity of the photoresponsive element. When the objective lens 2 is not held in a proper focus, rays of light impinging upon the photoresponsive elements PD$_1$ and PD$_2$ are those reflected from different portions of the target object. The deviation of those rays of light reflected from respective portions of the target object in the image scanning direction in which the image of the target object is scanned by the spatial filter 3 is determined by the displacement of the centers of luminosity of two exit pupils of the objective lens 2 in the image scanning direction of the spatial filter, that is, the displacement of the centers of receptivity of the photoresponsive elements PD$_1$ and PD$_2$ in the image scanning direction of the spatial filter 3, at the same time the objective lens 2 is brought into the proper focus. By way of example, assuming that the optical filter 3 undergoes its scanning operation in the Y-axis direction, the output signals generated from the respective photoresponsive elements PD$_3$ and PD$_4$ which are positioned at Y=0 as shown in any one of FIGS. 2(a) to 2(c) have no difference in phase from each other, but the output signal from the photoresponsive element PD$_1$, whose center of receptivity is located at Y=y$_1$, is shifted in phase from the output signal from the photoresponsive element PD$_2$ whose center of receptivity is located at Y=y$_2$ (y$_1$≠y$_2$). Accordingly, the difference between the output signals from the photoresponsive elements PD$_1$ and PD$_3$ or the ratio of the output signal from the photoresponsive element PD$_1$ to that from the photoresponsive element PD$_3$ forms a first desirable signal with the noise cancelled. A second desirable signal without noise is obtainable from the output signals from the photoresponsive elements PD$_2$ and PD$_4$ in a similar manner. Thus, the difference in phase between the first and second desirable signals is indicative of the desired autofocus information.

Note that, if the photoresponsive elements are arranged around the optical axis X (Y=0, Z=0) of the objective lens system in the manner such as shown in any one of FIGS. 2(a) to 2(c), the focus detection can be carried out even if the aperture of the objective lens system is stopped down to a minimum possible value. Furthermore, even with the arrangement shown in FIG. 2(d) wherein the photoresponsive element PD$_4$, which has been described as employed in the photoelectric receiver unit shown in FIGS. 2(a) to 2(c), is omitted, the phase difference between the output signals from the respective photoresponsive elements PD$_1$ and PD$_2$ can satisfactorily and effectively be detected with no substantial reduction in performance of the rangefinder system.

Figures 5, 5A:
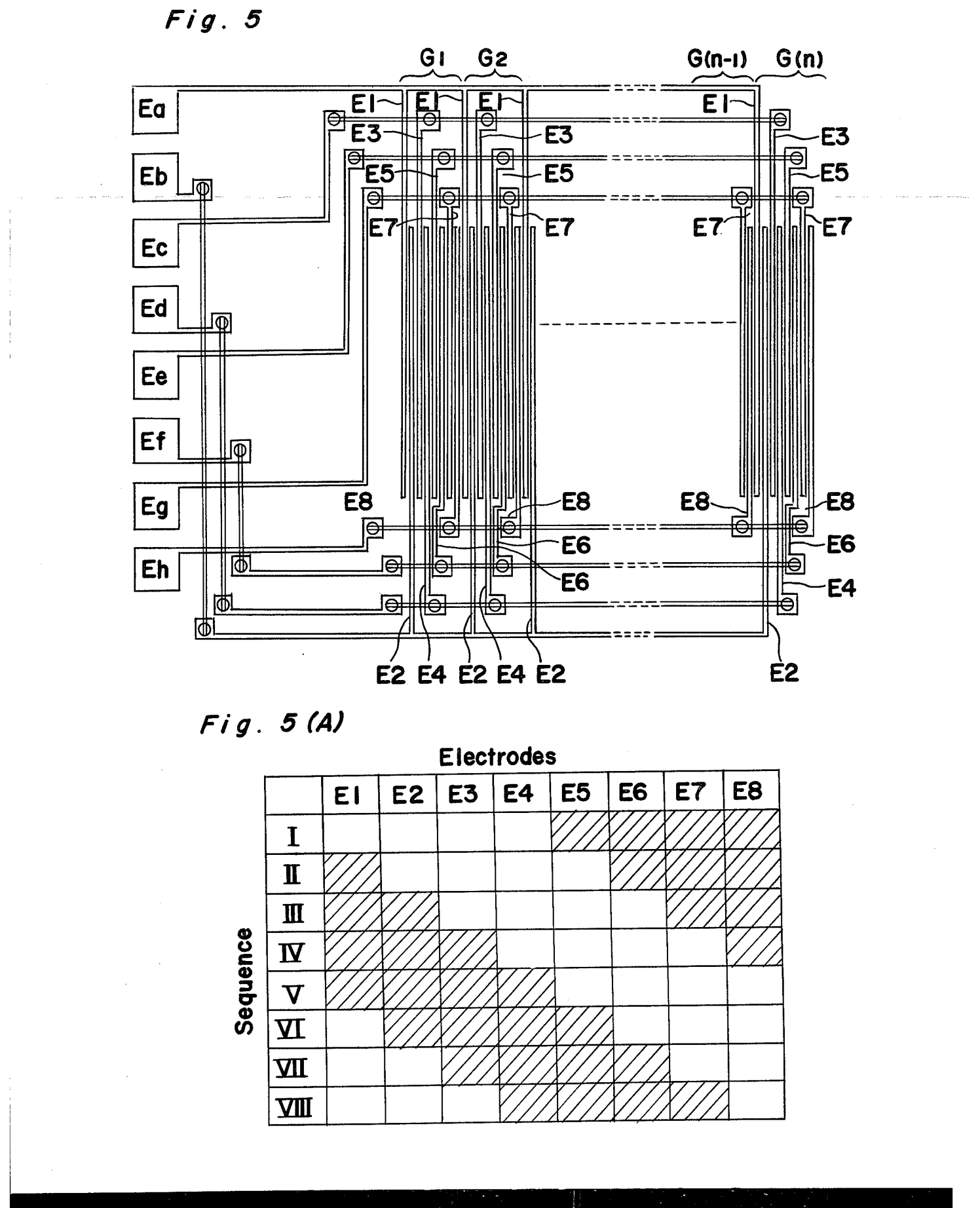

Referring now to FIGS. 4 and 5, the spatial filter 3 employed in the present invention is in the form of an electro-optical panel, for example, a liquid crystal panel as illustrated, and comprises a sequentially arranged series of electrode groups G1, G2, . . . G(n−1) and G(n) of interlaced electrodes, each electrode group being having eight electrodes E1, E2, . . . E7 and E8 which extend in an equally spaced parallel relation to each other. The interlaced electrodes E1 to E8 of the electrode groups G1, G2, . . . G(n−1) or G(n) have respective terminals Ea, Eb, . . . Eg and Eh, each terminal being common to all of the electrodes belonging to such particular group. As best shown in FIG. 5, the electrodes of all of the electrode groups extend in an equally spaced parallel relation to each other and are operatively associated with a common electrode N as shown in FIG. 4 in a manner as will be described later. The common electrode N is of a size sufficient to cover the area where the electrodes of all of the sequentially arranged electrode groups G1 to G(n) and is positioned spaced a predetermined distance from the common plane in which the electrodes of the sequentially arranged electrode groups lie, the space between the common electrode N and the sequentially arranged series of the electrode groups of the interlaced electrodes containing an electro-optical materia, for example, a liquid crystal, hermetically sealed therein.

Referring still to FIG. 4, a sync pulse generator forming a component of the circuit block 7 shown in FIG. 1 is identified by P.G. and is electrically connected to a divider P and also to the common electrode N for applying a train of sync pulses having a 50% duty cycle to the divider P and also to the common electrode N. A filter drive circuit forming another component of the circuit block 7 comprises a power source switch S1, a differential circuit D composed of a series-connected capacitor C1 and resistor R1, a shift registor S and a plurality of eclusive OR gates ORa, ORb, . . . ORg and ORh equal in number to number of the terminals Ea to Eh of the spatial filter 3.

Figure 6:
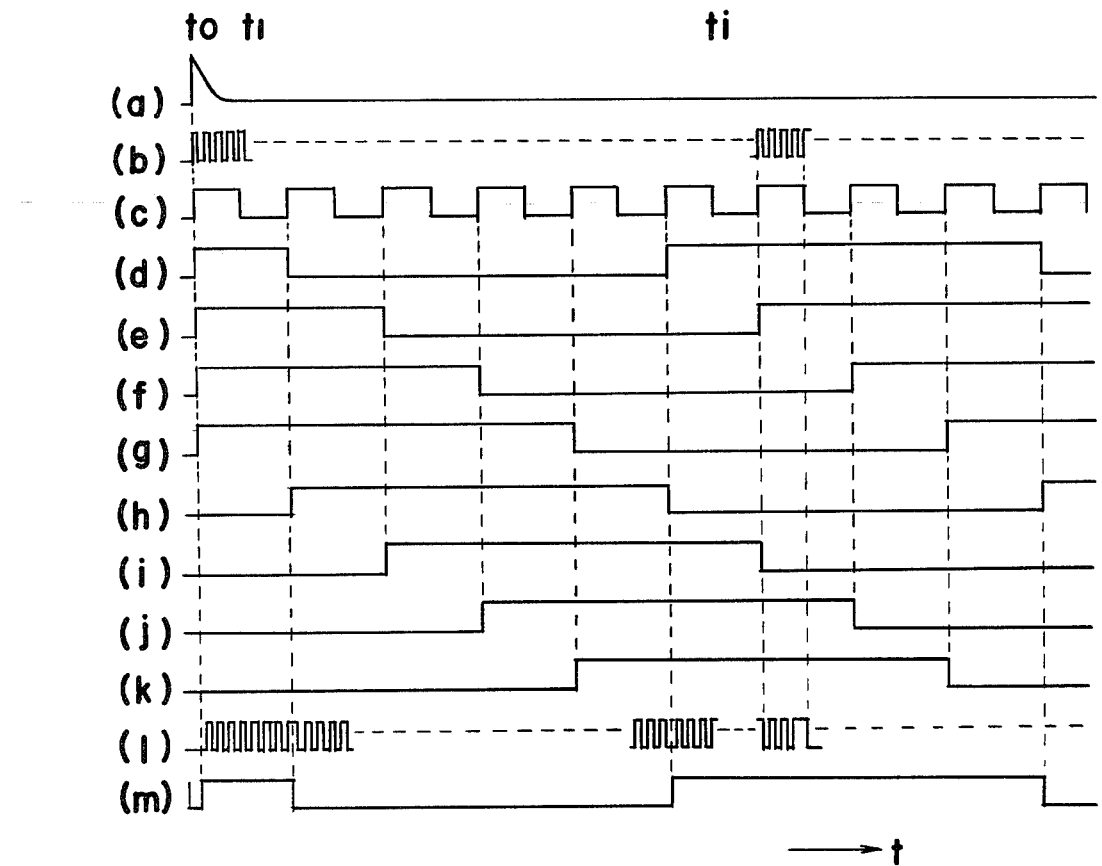
FIG. 6 is a chart showing waveforms of various signals employed in the electric circuitry of the system shown in FIG. 1.

The spatial filter 3 and the associated filter drive circuit are designed so as to operate in a manner, which will now be described with reference to FIG. 6. Assuming that the power switch S1 is closed, an electric signal having the waveform shown by (a) in FIG. 6 is applied from the differential circuit D to the SP input terminal of the shift registor S. The differentiated signal applied to the SP input terminal of the 8-bit shift registor S serves as a trigger signal for operating the shift register S which has a CP input terminal to which a train of sync pulses having the waveform shown by (b) in FIG. 6 has been applied from the pulse generator P.G. through the divider P. This 8-bit shift register S has eight output terminals Sa, Sb, ... Sg and Sh whereby, upon application of the differentiated signal from the differential circuit D to the SP input terminal, the first four output terminals are arraged to produce high level signals while the remaining four output terminals are arranged to produce low level signals. Since the last output terminal Sh of the shift registor S is connected to a SI input terminal of the shift register S, the shift registor S continues to produce output signals from the respective output terminals Sa to Sh in synchronism with the sync pulses applied to the CP input terminal from the divider P. The waveforms of the pulsating signals produced from the respective output terminals Sa to Sh of the shift registor S are shown by (d), (e), ... (j) and (k) in FIG. 6, respectively. The output terminals Sa to Sh of the shift register S are connected to first input terminals of the exclusive OR gates ORa to ORh, respectively, with the second input terminals of these exclusive OR gates being connected to the pulse generator P.G. Each of the exclusive OR gates ORa, ORb, ... ORg or ORh is operable in such a manner that, when the high level output signal is applied to the first input terminal from the corresponding output terminal of the shift register S, the exclusive OR gate produces an output pulse opposite in phase to the sync pulse and when the low level output signal is applied to the first input terminal from the corresponding output terminal of the shift register S, the exclusive OR gate produces an output pulse synchronized in phase with the sync pulse. The waveform of the output pulses from any one of the exclusive OR gates is shown by (l) in FIG. 6.

Accordingly, as shown by (m) in FIG. 6, the electric potential difference between the common electrode N and one of the interlaced electrodes of all of the electrode groups in the spatial filter 3 will be in a high level state when a high level output signal appears on the output terminal of the shift registor S to which that interlaced electrode is connected through the corresponding exclusive OR gate, and will be in a low level state when a low level output signal appears on that output terminal of the shift register S. In view of this, the spatial filter 3 can be electrically driven in such a manner that those portions of the liquid crystal between the common electrode N and any one of four of the interlaced electrodes of each electrode group become transparent and those portions of the same liquid crystal between the common electrode N and any one of the remaining four interlaced electrodes of the corresponding group become opaque when each pulse is applied to the CP input terminal of the shift register S from the divider P. The positions of the transparent area and the opaque areas sequentially shift from one place to the next adjacent place during each cycle of application of eight pulses to the CP input terminal of the shift register S from the divider P, in the manner shown in the chart of FIG. 5(A), wherein the blank blocks represent the transparent portions of the liquid crystal while the hatched blocks represent the opaque portions of the same liquid crystal.

From the foregoing, it will readily be seen that the spatial filter 3 when electrically driven provides alternate transparent and opaque strips each extending in one direction a distance equal to the pitch between any adjacent two of the interlaced electrodes. The operation of the spatial filter 3 may be termed "self-scanning" and can provide a filter effect similar to that afforded by a mechanical spatial filter of the slit type adapted to be moved reciprocally in a direction perpendicular to the optical axis of the objective lens.

Not only is the scanning precision exhibited by the electro-optical spatial filter 3 of the construction described above high as compared with the conventional slit type spatial filter, but also the electro-optical spatial filter 3 can be assembled in a compact size. Moreover, the electrode arrangement such as shown in FIG. 5 is suited for a mass production and, furthermore, if the output signals from the photoresponsive elements are synchronized with the output pulses generated by the divider P for driving the liquid crystal in the spatial filter as will be described later, the signal processing can readily be performed.

Figure 7:
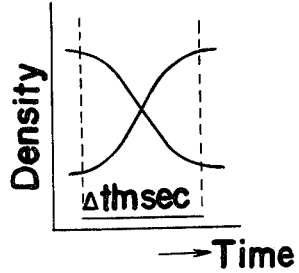
FIG. 7 is a graph showing the response characteristic of the liquid crystal used in the spatial filter.
Figure 8:
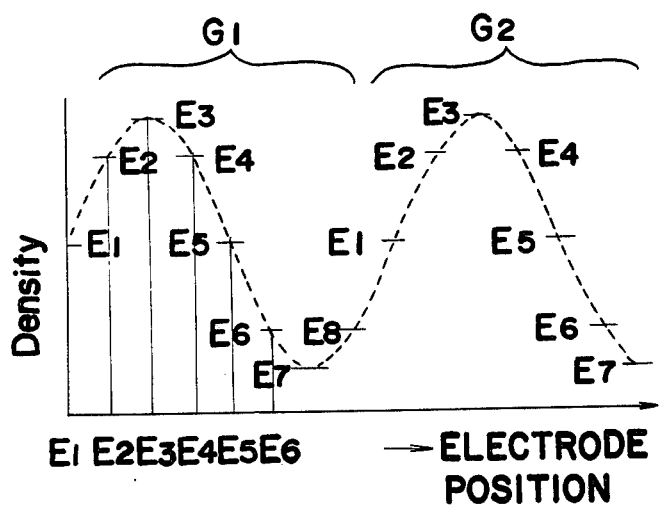
FIG. 8 is a graph showing the pattern of concentration distribution of the liquid crystal relative to the associated electrodes forming the spatial filter.

FIG. 7 illustrates the variation in density of the liquid crystal in the spatial filter 3 in time which is exhibited when an electrical potential difference is developed between the common electrode N and the electrodes E1 to E8 of the electrode groups G1 to G(n). As can readily be understood from FIG. 7, the concentration of the liquid crystal in the spatial filter 3 does not readily change between the two extreme values when the potential difference is developed, but the responsivity of the liquid crystal in the spatial filter 3 is so low that it will take a certain time $\Delta t$ msec. for the liquid crystal in the spatial filter 3 to attain one extreme value of concentration. Therefore, if the time $\Delta t$ msec. is chosen to be equal to the length of time corresponding to each four of the output pulses applied from the divider P and if the applied voltage and the kind of liquid crystal are suitably selected, the density distribution of the liquid crystal between each of the interlaced electrodes of each electrode group and the common electrode undergoes simple harmonic oscillation as shown in FIG. 8. This is because the density of the liquid crystal at each electrode oscillates and each interlaced electrode is displaced in phase from one position to the next adjacent position with every eighth electrode of each group synchronized in phase. Further, note that the density distribution shown in FIG. 8 shifts in time. Accordingly, the spatial filter 3 employed in the present invention can satisfactorily and effectively operate in a manner similar to the conventional slit-type spatial filter exhibiting a density distribution represented by simple harmonic oscillation when mechanically reciprocately moved.

Hereinafter, the reason that the signal processing can readily and simply be achieved if such a spatial filter having a density distribution represented by simple harmonic oscillation is employed will now be described.

In general, the intensity of the incident light projected onto one of the photoresponsive elements through a certain area of the liquid crystal can be expressed by the following formula:

$$f(x_{\alpha\beta}) \sin \{\omega t+(\alpha-1)\cdot\pi/4\} \ldots \quad (1)$$

wherein $\omega$ represents the angular frequency of the spatial filter, $x_{\alpha\beta}$ represents a certain area of the spatial filter, $f(x_{\alpha\beta})$ represents the intensity of the incident light projected onto the photoresponsive element through this area $x_{\alpha\beta}$ of the spatial filter when the light transmissivity of the spatial filter is 1, $\alpha$ represents an integer within the range of 1 to 8, and $\beta$ represents an integer within the range of 1 to n. Similarly, the intensity of the incident light projected onto the other of the photoresponsive elements can be expressed by the following formula:

$$g(x_{\alpha\beta}) \sin \{\omega t + (\alpha - 1) \cdot \pi/4\} \ldots \quad (2)$$

wherein $g(x_{\alpha\beta})$ represents the intensity of the incident light projected onto the other photoresponsive element through this area $x_{\alpha\beta}$ of the spatial filter when the light transmissivity of the spatial filter is 1.

Accordingly, the outputs $I_1$ and $I_2$ from the respective photoresponsive elements are expressed by the following equations:

$$I_1 = \sum_{\beta=1}^{n} \sum_{\alpha=1}^{8} f(x_{\alpha\beta}) \sin\{\omega t + (\alpha - 1) \cdot \pi/4\} \quad (3)$$

$$I_2 = \sum_{\beta=1}^{n} \sum_{\alpha=1}^{8} g(x_{\alpha\beta}) \sin\{\omega t + (\alpha - 1) \cdot \pi/4\} \quad (4)$$

If modified into a single trigonometrical function, these equations (3) and (4) above can be expressed as follows:

$$I_1 = K_1 \cdot \sin\{\omega + \phi_1\} \ldots \quad (5)$$

$$I_2 = K_2 \cdot \sin\{\omega + \phi_2\} \ldots \quad (6)$$

On the other hand, when the objective lens is held in a proper focus, $K_1$ will be equal to $K_2$ and $\phi_1$ will also be equal to $\phi_2$. However, when the objective lens is out of focus, $\phi_1$ and $\phi_2$ will take different values, the maginitude of each of these values $\phi_1$ and $\phi_2$ depending upon whether the objective lens is in the front focus relationship or in the rear focus relationship. Therefore, depending upon what values $\phi_1$ and $\phi_2$ take, it can be readily determined whether or not the objective lens is held in proper focus. In addition, since the angular frequency of the output signals from the respective photoresponsive elements corresponds to the angular frequency of the electro-optical spatial filter, that is, the angular frequency of the self-scanning of the liquid crystal, the scanning operation of the liquid crystal can be advantageously synchronized with the signal processing. Note that, even though $K_1$ will not become equal to $K_2$ when the objective lens is out of focus, this does not adversely affect the signal processing since what is required is the phase difference developed between the output signals from the respective photoresponsive elements, not the absolute value of the output signals from any one of the respective photoresponsive elements.

Figure 12:
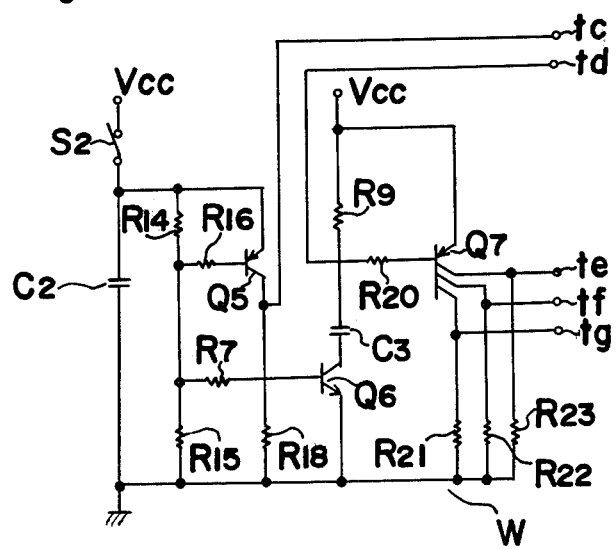
FIG. 12 is a diagram showing an electric switching circuit for initiating the operation of the rangefinder system.

The signal processing circuit employed in the present invention comprises a conversion circuit V, constructed as shown in FIG. 9, for converting the analog output signals of the photoresponsive elements into readily handleable digital signals after any noise components caused by the effect of flickering of a fluorescent lamp have been eliminated from the respective output signals from the photoresponsive elements PD$_1$ and PD$_3$, and a switching circuit W constructed as shown in FIG. 12 for generating an initiating signal necessary to bring the rangefinder system into an operative condition.

Referring first to FIG. 9, the photoresponsive elements PD$_1$ to PD$_4$ are connected to respective amplifiers A1, A2, A3 and A4 each having an output terminal. The output current from the corresponding photoresponsive element PD$_1$, PD$_2$, PD$_3$ or PD$_4$ is logarithmically compressed by the voltage across the base-emitter path of a corresponding transistor Q1, Q2, Q3 or Q4 and is outputted by the corresponding amplifier output terminal.

The output signals from the amplifiers A1 and A2 are applied to a first subtraction circuit composed of resistors R3, R4, R5, R6 and R7 and operational amplifiers A5 and A6. The subtraction circuit serves to eliminate the noise components from the output signals applied thereto from the amplifiers A1 and A2. The output signal produced by the subtraction circuit is then applied to a first D.C. component filtering circuit which is composed of a capacitor C11 and a resistor R42 and is operable to remove the D.C. component from the output signal of the operational amplifier A6 so that an electric intelligence signal representative of the phase information necessary to effect an automatic focus adjustment appears at a junction J1 between the resistor R42 and the capacitor C11. The waveform of the intelligence signal at the junction J1 is shown by (A) in FIG. 15.

Figure 15:
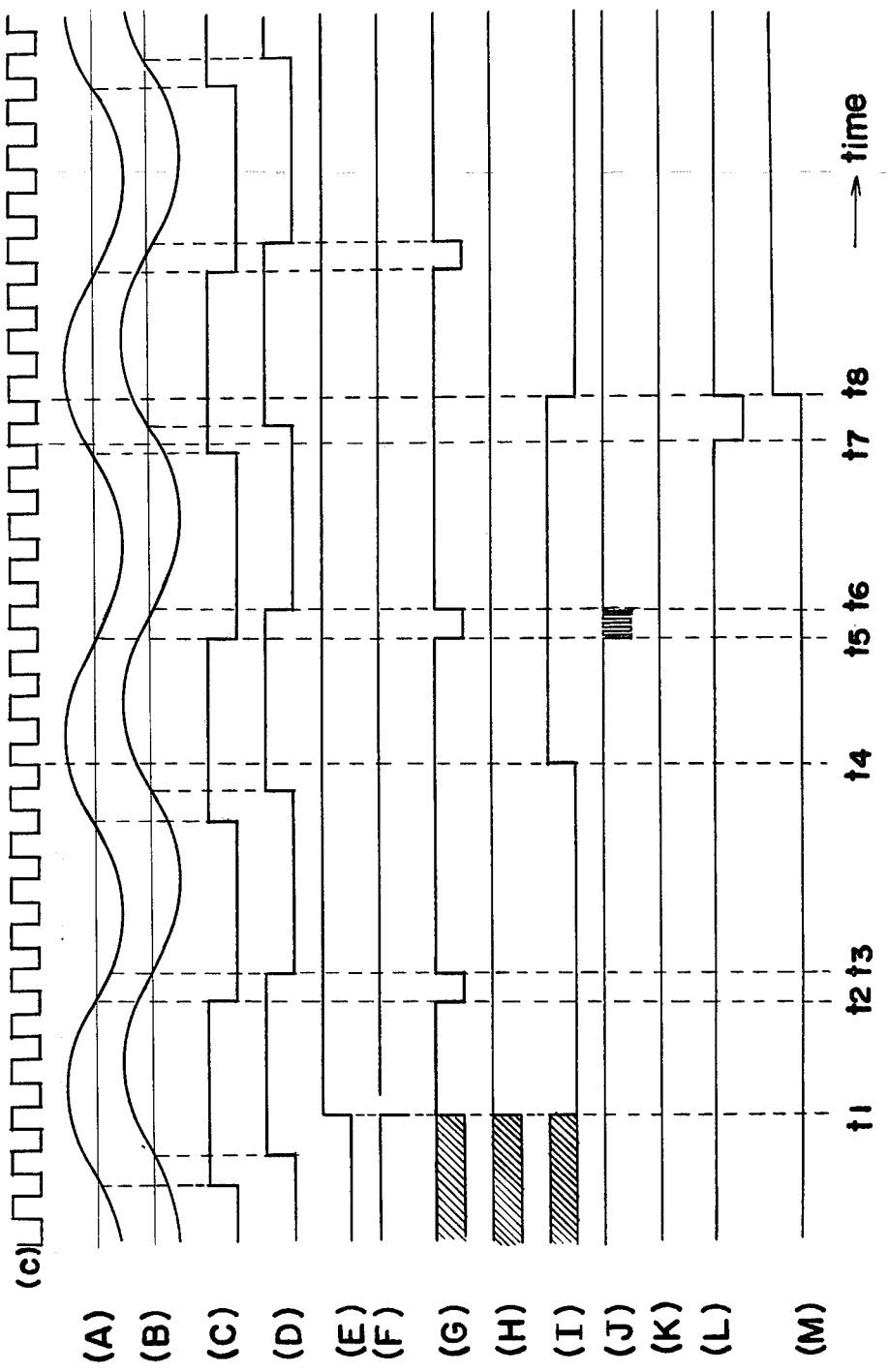
FIG. 15 is a chart illustrating waveforms of various electric signals appearing in the circuits shown in FIGS. 9, 12, 13 and 15.

Similarly, the output signals from the amplifiers A3 and A4 are processed in a manner similar to the output signals from the amplifiers A1 and A2 described above through a second subtraction circuit, composed of resistors R8, R9, R10 and R11 and operational amplifiers A7 and A8, and then through a second D.C. component filtering circuit, composed of a capacitor C12 and a resistor R43. The result is that an intelligence signal representative of phase information such as shown by (B) in FIG. 15 appears at the junction J2 between the capacitor C12 and the resistor R43. Note that the waveforms shown in FIG. 15 are observed when the objective lens is held in the rear focus relationship.

The intelligence signals appearing respectively at the junctions J1 and J2 are separately applied to first and second comparators respectively composed of operational amplifiers A11 and A12. The output signals from the individual comparators have the waveforms as shown by (C) and (D) in FIG. 15. From FIG. 15, it will readily be seen that the output signal from any one of the comparators composed respectively of the operational amplifiers A11 and A12 is a rectangular waveform having no amplitude information so that it can readily and easily be handled by a circuit construction will subsequently be described with reference to FIG. 13.

Referring now to FIG. 12, the switching circuit W includes a manipulatable switch S$_2$ adapted to be closed by the operator of the rangefinder system when a distance measurement is performed by the rangefinder system, and a capacitor C2 used to prevent any possible chattering from the switch S$_2$. This switching circuit W has five output terminals tc, td, te, tf and tg. The output terminal tc is connected to the junction between the collector of a transistor Q5 and a resistor R18, the output terminal td is connected to the junction between a resistor R19 and a capacitor C3 and the output terminal te, tf and tg are respectively connected to the first, second and third collectors of a multicollector transistor Q7. On the other hand, the output terminal tc is in turn connected to decoders D1, D2 and D3, shown in FIGS. 13 and 14, for providing an electric power to said decoders D1, D2 and D3; the output terminal td is in turn connected to counters U1, U2 and U3 and the reset terminal of a R-S flip-flop composed of NAND gate NAND10 and NAND11 shown in FIG. 13; the output terminals te and tf are in turn connected to respective reset terminals of a phase difference detector composed of NAND gates NAND1, NAND2, ... NAND8 and NAND9 as shown in FIG. 13; and the output terminal tg is in turn connected to a reset terminal of a R-S flip-flop composed of NOR gates NOR1 and NOR2 as shown in FIG. 14.

Figure 11:
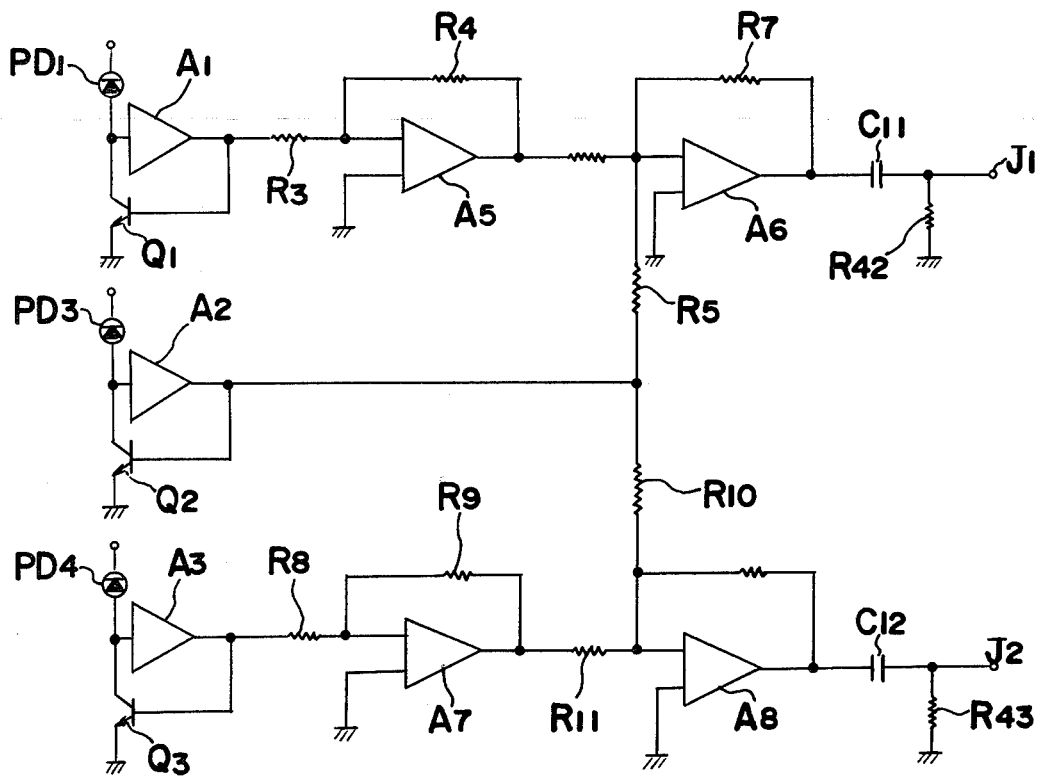
FIG. 11 is a diagram showing another modified form of the conversion circuit.

Note that the conversion circuit V constructed as shown in FIG. 9 is operable to logarithmically compress the output currents from the respective photoresponsive elements to produce readily processable voltage signals so that the ratio of these output currents can be generated. However, a similar circuit shown in FIG. 10 is effective to produce a signal indicative of the difference between the output currents from the respective photoresponsive elements. In addition, where the photoelectric receiver unit is composed of three photoresponsive elements such as shown in FIG. 2(d), the conversion circuit having the construction shown in FIG. 11 can be employed. Further, noted that the above described device for removing the fluorescent light noise is applicable not only in the case of the electro-optical spatial filter described, but also in the case of a conventional mechanically reciprocated type spatial filter.

Figure 13:
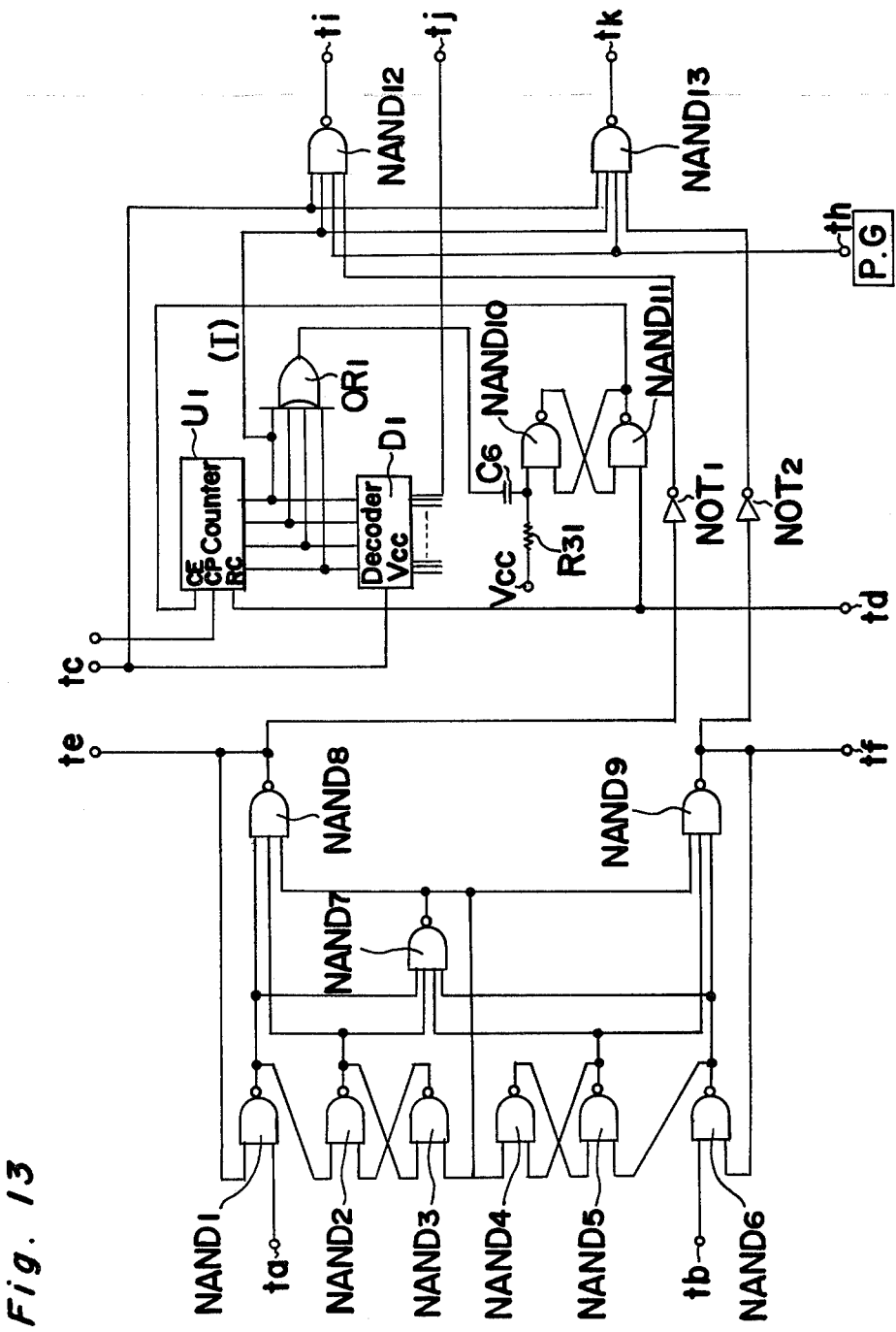
FIG. 13 is a diagram showing an analog-digital converter circuit employed in the rangefinder system.
Figure 14:
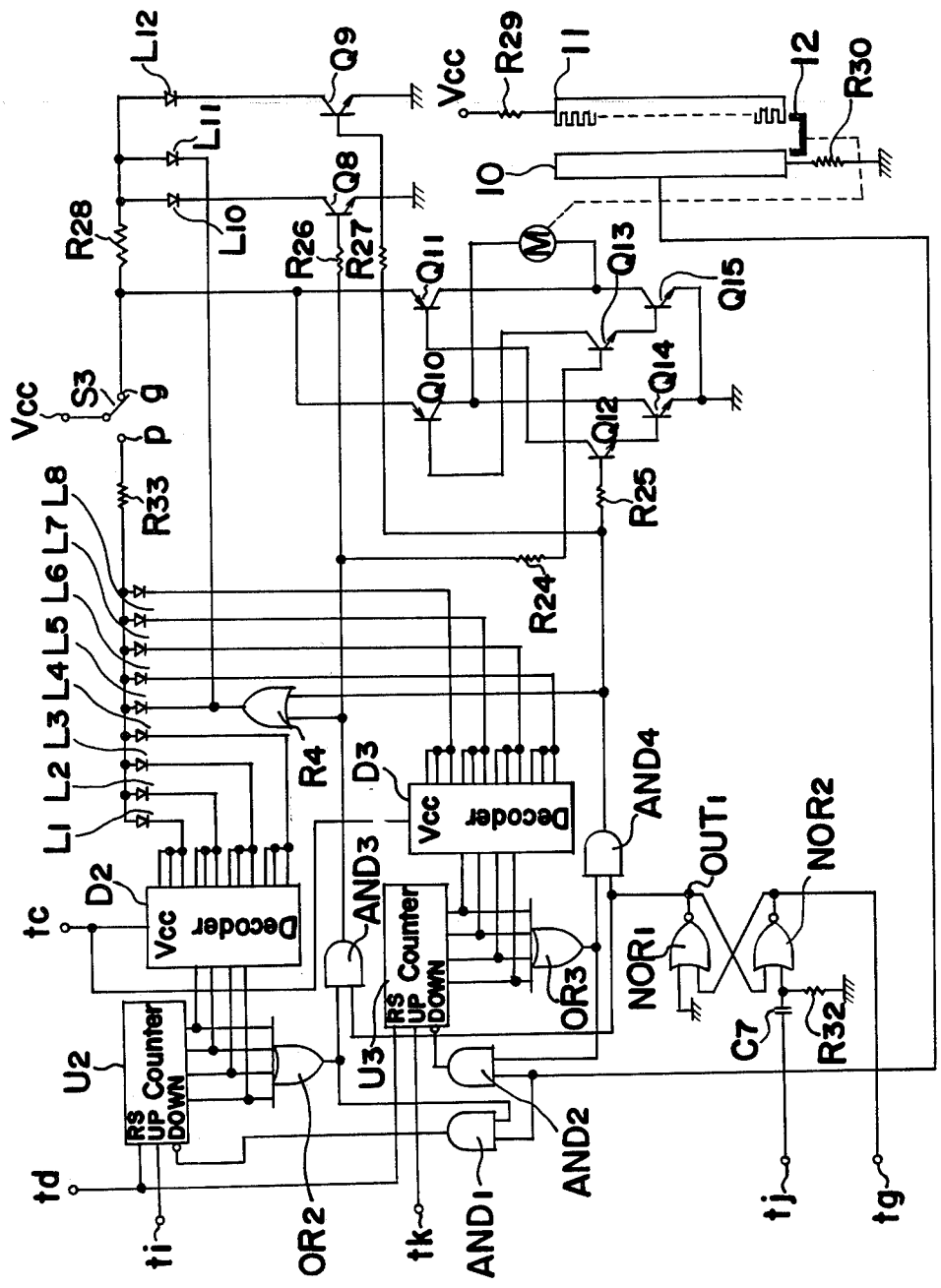
FIG. 14 is a diagram showing a display circuit and and the focus control servo circuit employed in the rangefinder system.

Refer now to FIG. 13 which illustrates an analog-digital converter for converting the analog intelligence signals of the waveforms (A) and (B) shown in FIG. 15 into digital signals. This converter includes a phase difference detector composed of NAND gates NAND1 to NAND9, the construction of which is well known to those skilled in the art. Although the levels at the terminals te and tf (FIG. 12) are not fixed prior to the rangefinder system being brought into operative condition, that is, prior to the time $t_1$ shown in FIG. 15, closure of the switch S2 at the time $t_1$ causes both the terminals te and tf to be reset to high level states. However, the terminal te assumes a low level state when the terminals ta and tb are respectively placed in a low and a high level state. Note that, at this time, the terminal tf remains in a high level state. The condition of the terminals te and tf at this time are illustrated by the respective waveforms (G) and (H) in FIG. 15.

If the signal at terminal ta is a low level and the signal at terminal tb is a high level at the time $t_1$, the terminals te and tf will both be in the high level state during the initial cycle which ends at the time $t_4$, but when the signal at terminal ta becomes a low level state and the signal at terminal tb becomes a high level state, subsequent to the start of the next suceeding cycle, the terminal te assumes a low state while the terminal tf remains in a high level state. This is the case when the objective lens is held in the rear focus. However, where the objective lens is held in the front focus relationship, the terminal tf assumes a low level state while the terminal te remains in a high level state, when the signal at terminal ta becomes a high level state and the signal at terminal tb becomes a low level state. Even in this case, if the signal at terminal ta is a high level and at terminal tb is a low level at the time $t_1$ of closure of the switch S2, the terminals te and tf are both in a high level state during the initial cycle, but when the signal at terminal ta becomes a high level state and the signal at terminal tb becomes a low level state subsequent to the next succeeding cycle, the terminal tf assumes a low level state while the terminal te remains in the high level state.

The circuit including the counter U1, the OR gate OR1, the NAND gates NAND10 and NAND11, capacitor C6 and resistor R31 constitutes a counter circuit capable of counting two cycles starting from the time $t_1$, that is capable of counting clock pulses of the waveform shown by (c) in FIG. 15 up to 16 pulses. This counter circuit is employed in view of the fact that no signal indicative of the phase difference will be generated during the initial cycle, but rather will be first generated during the next succeeding cycle, depending upon the initial states of the signals appearing at the terminals ta and tb at the time of closure of the switch S2, and also in view of the fact that it is necessary to reposition the objective lens after completion of the distance measurement.

The operation of the counter circuit will first be described. Assuming that the switch S2 (FIG. 12) is closed, the reset signal having the waveform shown by (F) in FIG. 15 is so applieed to the R-S flip-flop, composed of the RS terminal of the counter U1 and the gates NAND10 and NAND11, that the counter U1 can be zeroed and, at the same time, the R-S flip-flop starts counting the number of the clock pulses applied to the CP terminal of the counter U1. Since the input signals applied to the gates NAND10 and NAND11 are of low level and, therefore, both of the gates NAND10 and NAND11 generate high level signals. If the time constant of the differential circuit determined by the capacitor C6 and the resistor R31 shown in FIG. 13 is selected to be small as compared with that of the differential circuit determined by the capacitor C3 and the resistor R19 shown in FIG. 9, the outpt signal emerging from the gate NAND10, while the output signal from the gate NAND11 remains in the high level state, reversed from the high level state to a low level state and the counter U1 undergoes its counting operation with the high level signal applied to CE terminal thereof from the gate NAND11.

When the counter U1 has counted 16 clock pulses subsequent to the closure of the switch S2, that is, when the electro-optical spatial filter 3 has completed two cycles of its scanning operation, the counter U1 is reset to zero with the consequence that the output level of the gate OR1 becomes a low level. Accordingly, the output level of the gate NAND10 becomes a high level state while the output level of the gate NAND11 becomes a low level state, this output condition being maintained even if a high level input is subsequently applied to the gate NAND10. Therefore, the CE terminal of the counter U1 remains at a low level state and the counter U1 does not undergo its counting operation. So long as the counter U1 does not undergo the counting operation, the outputs from this counter U1 are all at a low level state. The output (I) emerging from one of the output terminals of the counter U1 which corresponds to the place of the highest figure of the number of the clock pulses counted thereby will, as shown by the waveform (I) in FIG. 15, becomes a high level state at the time $t_4$, that is, in response to the leading edge of the eighth pulse, and a low level state at the time $t_8$, that is, in response to the leading edge of the 16th pulse, and will no longer become a high level state thereafter since the counter U1 does not continue the counting operation as hereinbefore described. In other words, the output (I) from the counter U1 remains in the high level state during a period starting from the time of closure of the switch S2 to the time at which the spatial filter 3 completes two cycles of its scanning operation. The decoder D1 connected to the counter U1 receives electric power from the transistor Q5 by way of the terminal tc (FIG. 12) when the switch S2 is closed. And, the 15th output terminal of the decoder D1 will be switched from a high level state to a low level state in response to the leading edge of the 15th pulse and from the low level state back to the high level state in response to the 16th pulse, the waveform of which is shown by (L) in FIG. 15. The manner of utilization of this signal will be described with particular reference to FIG. 14.

The output terminal ti of the gate NAND12 produces a train of pulses, opposite in phase to the clock pulses applied thereto from the generator P.G. by way of terminal th, when the signals appearing at the terminals tc and (I) are in a high level state while the signal appearing at the terminal te is in a low level state. In other words, during the second cycle of the scanning operation of the spatial filter 3 subsequent to the closure of the switch S2, when the objective lens is held in the rear focus relationship, the gate NAND12 generates through the output terminal ti a train of pulses corresponding in number to the deviation of the objective lens relative to the predetermined image forming plane. Similarly, the NAND gate NAND13 generates a train of pulses corresponding in number to the deviation of the objective lens relative to the predetermined image forming plane when the objective lens is held in the front focus relationship.

FIG. 14 illustrates a motor drive circuit for energizing a drive motor M to reposition the objective lens in response to one of the digital signals respectively generated from the gate NAND12 or the gate NAND13 in the manner as hereinabove described, and a display circuit for displaying in a viewable form information indicative of the deviation of the objective lens 2 relative to the predetermined image forming plane.

Referring to FIG. 14, when the movable contact of a switch S3 connected to a power source Vcc is engaged with the fixed terminal p and a train of pulses indicative of the deviation of the objective lens in a direction rearward of the proper focus is applied through the terminal, ti to the UP terminal of the counter U2, this train of pulses is counted by the counter U2. When the output terminal of the decoder D2 which corresponds to the number of the pulses counted by the counter U2 is subsequently assumes a low level state, the light emitting diode L1, L2, L3 or L4 which is connected that output terminal of the decoder D2 is turned on to show the operator of the rangefinder system that the objective lens is displaced out of focus in the direction rearward of the predetermined image forming plane by a distance indicated by the number of pulses appearing at the terminal ti. By way of example, since the pulse train appearing at the terminal ti has five pulses as shown by the waveform (J) in FIG. 15, the light emitting diode L3 is turned on in the manner described above.

In the case where the objective lens is out of focus displaced in a direction forward of the predetermined image forming plane, the gate NAND13 generates a train of pulses through the output terminal tk which is fed to the UP terminal of the counter U3 whereat the pulses, whose number corresponds to the deviation of the objective lens, are counted. When the output terminal of the decoder D3 which corresponds to the number of the pulses counted by the couner U3 subsequently assumes a low level state, the light emitting diode L6, L7, L8 or L9 which is connected that output terminal of the decoder D3 is turned on to show the operator that the objective lens is displaced out of focus in the direction of forward of the predetermined image forming plane by a distance indicated by the number of the pulses appearing at the terminal tk.

When the spatial filter 3 undergoes two cycles of the scanning operation subsequent to the closure of the switch S2, an output signal having the waveform shown by (L) in FIG. 15 is generated from the 16th output terminal of the decoder D1, which is in turn applied to one input terminal of the NOR gate NOR2 through a differential circuit composed of a capacitor C7 and a resistor R32. The output terminal OUT1 of the R-S flip-flop composed of the NOR gates NOR1 and NOR2 assumes a low level state, since the output terminal of the NOR gate NOR2 is reset to a high level state by the signal appearing at the terminal tg upon closure of the switch S2, so that, when the output terminal tj from the decoder D1 is switched from a low level state to a high level state, the output terminal OUT1 of the gate NOR1 changes from a low level state to a high level state as shown by the waveform (M) in FIG. 15.

If the objective lens 2 is axially moved manually by the operator with reference to the one of the light emitting diodes L1 to L9 which is turned on, a bridge member 12 moves together with the movement of the objective lens 2. As this bridge member 12 slides along an elongated contact member 10 on the one hand and sequentially sweeps along the teeth of a substantially comb-shaped contact member 11 on the other hand a train of pulses, the number of which corresponds to the distance of axial movement of the objective lens 2, is applied to the first input terminals of both AND gates AND1 and AND2. These gates AND1 and AND2 have second input terminals which are respectively connected to the output terminal of OR gate OR2, which has its input terminals connected to the four output terminals of counter U2, and to the output terminal of OR gate OR3 which has its four input terminals connected to respective output terminals of counter U3. In this arrangement, in the case where the objective lens is held in the rear focus relationship, the output from the gate OR2 is in a high level state and the gate AND1 is turned on to allow the passage of the train of pulses from the comb-shaped contact member 11 to the DOWN terminal of the counter U2. On the other hand, since the output from the gate OR3 is at this time held in a low level state and, therefore, the gate AND2 is kept switched off without the train of pulses from the comb-shaped contact member 11 being fed to the DOWN terminal of the counter U3. However, the reverse is true where the objective lens is held in the front focus relationship.

Where the objective lens is in the rear focus relationship and a train of pulses, the number of which is equal to the number of pulses stored in the counter U2, is fed to the DOWN terminal of the counter U2 by manually moving the objective lens 2, the output terminals of the counter U2 all assume a low level state, the consequence of which is that the gate OR2 generates a low level signal. At this time, the output from the gate OR3 is in a low level state and the output from the gate OR4 is turned from a high level state to a low level state, thus the light emitting diode L5 is turned on to show the operator that the objective lens 2 thus manually moved is brought into the proper focus. It will be readily seen that, if the manual movement of the objective lens 2 is interrupted at the time the light emitting diode L5 is turned on, the objective lens 2 is held in the proper focus and the operator can take a photographic picture of the target object. Note that, by utilization of the electric signal used to switch the lamp L5 on, it is possible to interrupt the movement of the objective lens by way of an electromagnet device. Although this arrangement is not shown, it is well known to those skilled in the art.

Furthermore, if desired, the number of the light emitting diodes L1 to L8 may be more than eight such as shown in FIG. 14, so that the deviation of the objective lens can be displayed more accurately.

When automatic focus adjustment of the objective lens 2 is desired, it what is necessary to manipulate the switch S3 to cause the movable contact to engage another fixed terminal q. If the movable contact of the switch S3 is so engaged to the fixed terminal q, and the objective lens is in the rear focus relationship, the output from the gates OR2 and OR3 are respectively is a high level state and is a low level state. On the other hand, at the completion of the second cycle the scanning operation of the spatial filter 3, the output terminal OUT1 of the R-S flip-flop assumes a high level state, thus the output from the gate AND3 becomes a high level state while the output from the gate AND4 remains in a low level state. Therefore, a transistor Q8 is switched on to turn on light emitting diode L10 to shown the operator the objective lens is in the rear focus relationship and, simultaneously therewith, transistors Q10, Q13 and Q15 are sequentially switched on to drive the motor M to move the objective lens in search of the proper focus setting. During the movement of the objective lens in the manner described above, the bridge member 12 is correspondingly moved in the manner hereinbefore described to generate a train of pulses corresponding in number to the displacement of the objective lens. This train of pulses is subsequently fed to the DOWN terminal of the counter U2. If the number of the pulss of the train fed to the DOWN terminal of the counter U2 matches the number of pulses stored in said counter U2, the output terminals of the counter U2 all assume a low level state, the consequence of which is that the outputs of the gates OR2 and AND3 assume a low level state and, therefore, light emitting diode L11 is turned on to show the operator that the objective lens 2 has been brought into the proper focus. Simultaneously therewith, the transistors Q10, Q13 and Q15 are sequentially switched off to interrupt the supply of electric power to the motor M and, therefore, the movement of the objective lens is interrupted at a position where the objective lens is held in the proper focus.

Similarly, where the objective lens is in the front focus relationship, the counter U3 stores a number corresponding to the deviation of the objective lens 2 and a transistor Q9 is switched on to turn on light emitting diode L12 for indicating to the operator that the objective lens 2 is in the front focus relationship. Simultaneously therewith, transistors Q11, Q12 and Q14 are sequentially switched on to drive the motor M in a direction, opposite to the direction of rotation of the same motor M which is effected when the objective lens is in the rear relationship, to bring the objective lens 2 into the proper focus. Noted that the above described device for controlling the shift of the objective lens is not only connectable with the phase-difference-type focus condition detecting device described, but also with any other focus condition detecting device of a type which is capable of producing a signal indicative of the degree of displacement of the objective lens from the true focus position.

Figures 16, 17:
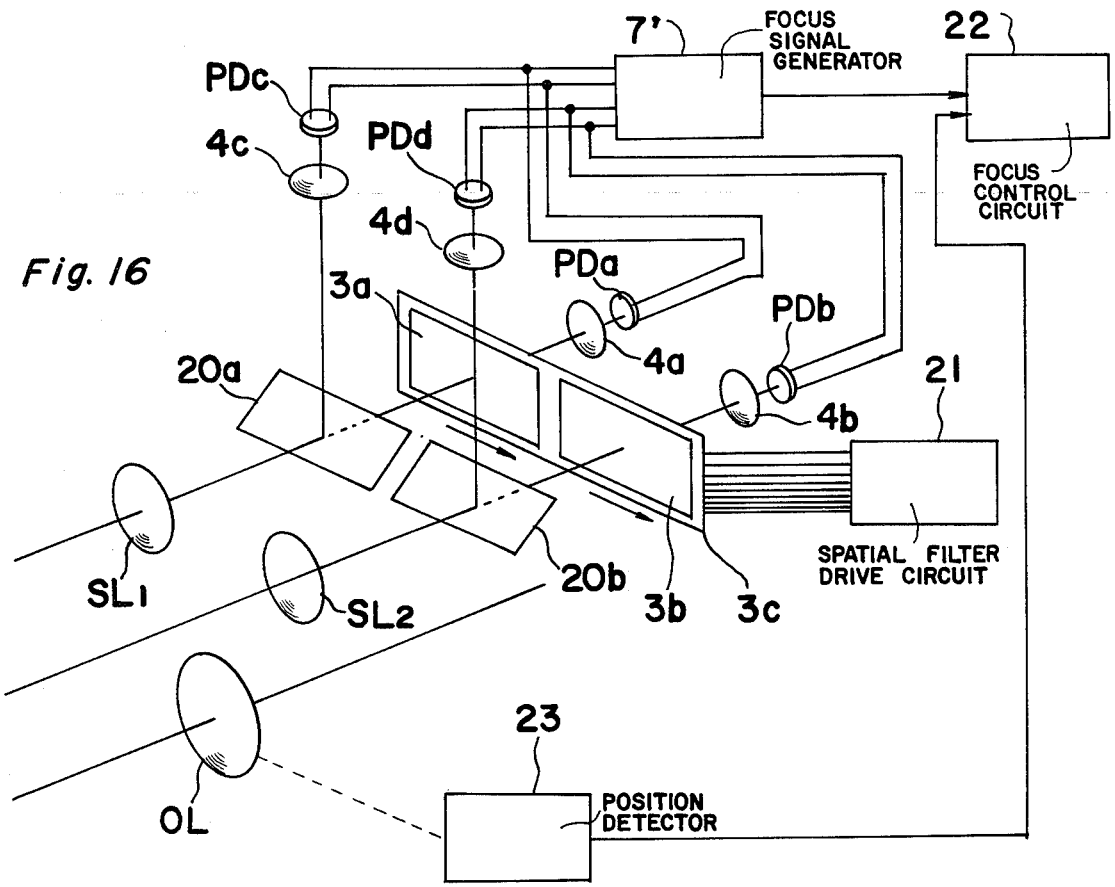
FIG. 16 is a schematic perspective view of a rangefinder system according to another preferred embodiment of the present invention.
FIG. 17 is a diagram showing the principle of the optical system employed in the rangefinder system of FIG. 16.

Referring now to FIG. 16 showing another embodiment of the present invention, the rangefinder system utilizes first and second phase-synchronized spatial filters 3a and 3b, each having a construction such as described with reference to and shown in FIGS. 4 and 5. These spatial filters 3a and 3b are arranged to lie in the same plane and are connected in a side-by-side relation to each other by a frame member 3c. The scanning operations of these spatial filters 3a and 3b take place in the same direction at the same velocity with their phases synchronized with each other. A drive circuit having the construction shown in FIG. 5 may be similarly employed for electrically driving the spatial filters 3a and 3b in synchronism with each other and is generally identified by 21 in FIG. 16.

The spatial filter assembly is arranged so that the spatial filters 3a and 3b occupy respective positions spaced rearward of associated stationary objective lenses SL1 and SL2, which have the same focal length, by a distance equal to the focal length of the lenses SL1 and SL2. These stationary objective lenses SL1 and SL2 are stationarily supported in a spaced side-by-side relation to each other and are optically positioned relative to the spatial filters 3a and 3b so that respective images of the same target object are projected on corresponding areas of the spatial filters 3a and 3b which are synchronized in phase to each other when the target object is located an infinite distance away from the photographic camera, but on areas of the corresponding spatial filters 3a and 3b from are displaced in phase with each other as the target object approaches the camera.

Positioned intermediately between the lenses SL1 and SL2 and the associated spatial filters 3a and 3b are beam splitters 20a and 20b used to direct a first portion of the incoming light, passing through the lenses SL1 and SL2, towards the photoresponsive elements PDc and PDd by way of relay lenses 4c and 4d, and the remaining portion of the incoming light being transmitted through the beam splitters 20a and 20b towards the photoresponsive elements PDa and PDb by way of associated relay lenses 4a and 4b. Note that the photoresponsive elements PDa, PDb, PDc and PDd structurally and functionally correspond to the photoresponsive elements $PD_1$, $PD_2$, $PD_3$ and $PD_4$, respectively, which have been described with reference to FIG. 1. The position of each of the relay lenses 4a to 4d is such that the corresponding stationary objective lens SL1 or SL2 and the corresponding photoresponsive element PDa, PDb, PDc or PDd assumes a conjugate relation with respect to each of the relay lenses 4a to 4d.

Note that the relay lenses 4a to 4d may not always be necessary and, therefore, may be omitted, in which case it is necessary to position the photoresponsive elements PDa and PDb immediately behind the associated spatial filters 3a and 3b in alignment with the respective optical axes of the stationary objective lenses SL1 and SL2 on the one hand and the photoresponsive elements PDc and PDd on the optical paths, deflected by the beam splitter 20a and 20b, at respective locations spaced a distance equal to the focal length of the stationary objective lenses SL1 and SL2 on the other hand. Note that, as is the case with the photoelectric receiver unit having the construction shown in FIG. 2(d) in the rangefinder system of FIG. 1, one of the photoresponsive elements PDc and PDd may be omitted. Further, note that the above described device for removing fluorescent light noise is applicable not only to the case of the electro-optical filters described, but also to the case of the conventional mechanically reciprocated spatial filters.

The photoresponsive elements PDa to PDd are electrically connected to a difference signal generator 7' including a conversion circuit having the construction shown in and described with reference to FIG. 9. This difference signal generator 7' is in turn connected to a focus control circuit 22 a A position detector 23 for generating a signal indicative of the position of a phototaking objective lens OL is also connected to focus control circuit 22. The focus control circuit 22 operates to visually display the distance of the target object relative to the predetermined image forming plane and the position of the objective lens OL relative to its proper focus position and also to reposition the objective lens OL in search of the true focus setting.

The principle of the optical system of the rangefinder system shown in FIG. 16 will now be described with reference to FIG. 17.

In FIG. 17, reference character D represents the distance between the target object 1 and the spatial filter assembly, and reference character $f_f$ represents the focal length of one of the stationary objective lens SL1 and SL2. The optical axis of each of these lenses SL1 and SL2 is spaced a distance Da from the optical axis X of the objective lens OL. Assuming that the image of a point a of the target object 1 is formed on a portion a' of the spatial filter 3a by the stationary objective lens SL1 and on a portion a'' of the spatial filter 3b by the stationary objective lens SL2, since the spatial filters 3a and 3b scan in a phase-synchronized relation in the same direction as indicated by the arrows, and in the same number of cycles, the intensity of light passing through the spatial filter 3a and subsequently sensed by the photoresponsive element PDa and that passing through the spatial filter 3b and subsequently sensed by the photoresponsive element PDb differ from each other at that point where the spot image is formed on the areas a' and a'' of the respective spatial filters 3a and 3b which are out of phase from each other. Accordingly, the output current generated from the photoresponsive element PDa differs from that generated from the photoresponsive element PDb at that point, however, these output currents becoming equal to each other after a predetermined period of time. Therefore, there is a difference in phase between the output signal from the photoresponsive element Pda and that from the photoresponsive element PDb. Assuming that the distance between the optical axis of the objective lens SL1 and the area a' of the spatial filter 3a and that between the objective lens SL2 and the area a'' of the spatial filter 3b are respectively expressed by $+x$ and $-x$ wherein $x>0$, the equation, $D=f_f(Da/x+1)$, is satisfied. Therefore, the distance D can be expressed in terms of the deviation of the areas a' and a'', that is, the difference in phase between the output signals from the respective photoresponsive elemnts Pda and PDb. The system appears to function erroneously if the target object has a uniform distribution of brightness. However, it may be considered that there exist no target objects having such a uniform distribution of brightness and, accordingly, the system will function satisfactorily and effectively.

The details of the focus control circuit 22 will now be described with reference to FIG. 18. The focus control circuit 22 includes an exclusive OR gate XOR9 having a pair of input terminals connected to the terminals ta and tb of the circuit shown in FIG. 9 and an output terminal connected to an AND gate AND3. The gates XOR9 and AND3 form a logic circuit which operates so that, when the signal appearing at the terminal ta having the waveform shown by (C) in FIG. 15 or FIG. 19 is in a low level state and the signal appearing at the terminal tb having the waveform shown by (D) in FIG. 15 or FIG. 19 is in a high level state, the logic circuit generates a high level signal from the output terminal of the gate AND3, the waveform of which is shown by (N) in FIG. 19. A T-flip-flop composed of a J-K-flip-flop and a resistor R40 is designed so that the output signal from the output terminal Q corresponds to the signal of the waveform (C) which has been multiplied two times, as shown by the waveform (O) in FIG. 19, while the output signal from the output terminal $\overline{Q}$ is opposite in phase to the output signal from the output terminal Q as shown by the waveform (Q) in FIG. 19. When the output signal from the output terminal $\overline{Q}$ is reversed from a low level state to a high level state and the output signal from the output terminal Q is reversed from a high level state to a low level state, an electric signal having the waveform shown by (R) in FIG. 19 is applied to the base of a transistor Q21 through a series connected resistor R43 and capacitor C15 to bring the transistor Q21 into a conductive state so that the voltage stored on capacitor C14 is discharged. Simultaneously therewith, transistor Q22 becomes non-conductive and transistor Q23 becomes conductive and, therefore, a buffer, composed of an operational amplifier A20, becomes inoperative and another buffer, composed of an operational amplifier A21 becomes operative. Under this condition, the electric potential from a constant current source PS2, the amount of which is determined by the resistance setting of an adjustable resistor PM which has a movable tap movable together with the movement of the objective lens OL in search of the true focus setting, is supplied through the buffer, composed of the operational amplifier A21, to an analog-digital converter 24 whereby one of a plurality of light emitting diodes $LED_1$, $LED_2$, ... $LED_{(n-1)}$ and $LED_{(n)}$ which corresponds to one of the focal positions at which the objective lens OL is then held is turned on to show the operator that the objective lens OL is held at that focal position. This condition continues up until the time $T_4$, i.e., when the output state of the T-flip-flop T-FF is reversed.

However, at the time $T_2$, the output signal from the gate AND3 becomes a high level state and, therefore, transistor Q20 becomes conductive to allow capacitor C14 to be charged from constant current source PS1, this charging of capacitor C14 continuing up until the time $T_3$, i.e., when the output from the gate AND3 becomes a low level state. Accordingly, the potential charged on the capacitor C14, as shown by the waveform (S) in FIG. 19, is a value indicative of the difference in phase betwween the signals appearing respectively at the terminals ta and tb, that is, indicative of the distance of the target object relative to the predetermined image forming plane. When the output state of the T-flip-flop T-FF is reversed at the time $T_4$, the buffer composed of the operational amplifier A20 becomes operative while the buffer composed of the operational amplifier A21 becomes inoperative, whereby an electric potential indicative of the distance of the target object relative to the predetermined image forming plane is applied to the analog-digital converter 24 so that the distance of the target object relative to the predetermined image forming plane can be visually displayed by one of the light emitting diodes $LED_1$ to LED$_{(n)}$. This condition continues up until the time T$_5$, i.e., when the output state of the T-flip-flop T-FF is reversed. Note that, during the period between the time T$_4$ and T$_5$, even though the output signal from the gate AND3 becomes a high level state, the potential charged on the capacitor C14 does not vary since the base potential of the transistor Q20 is in a high level state. When the output state of the T-flip-flop T-FF is again reversed at the time T$_5$, the transistor Q21 instantaneously conducts to discharge capacitor C14 whereby the buffer composed of the operational amplifier A20 becomes inoperative while the buffer composed of the operational amplifier A21 becomes operative. Accordingly, in a manner similar to that hereinbefore described, the position of the objective lens OL can be visually displayed by a corresponding one of the light emitting diodes LED$_1$ to LED$_{(n)}$. The foregoing operation is hereafter repeated.

Figure 19:
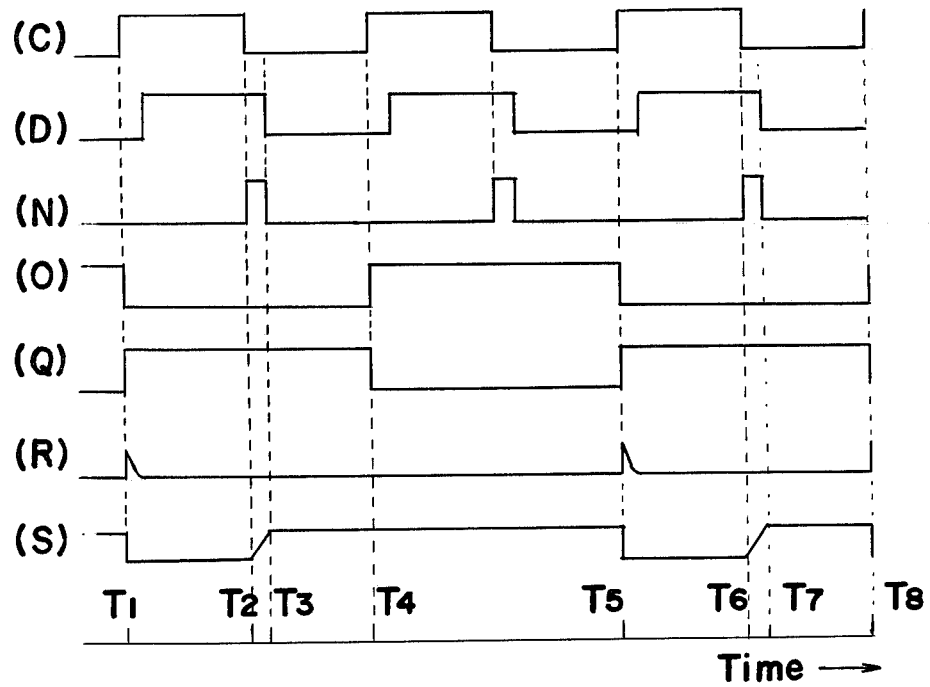
FIG. 19 is a chart showing waveforms of various signals appearing in the circuit of FIG. 18.
Figure 20:
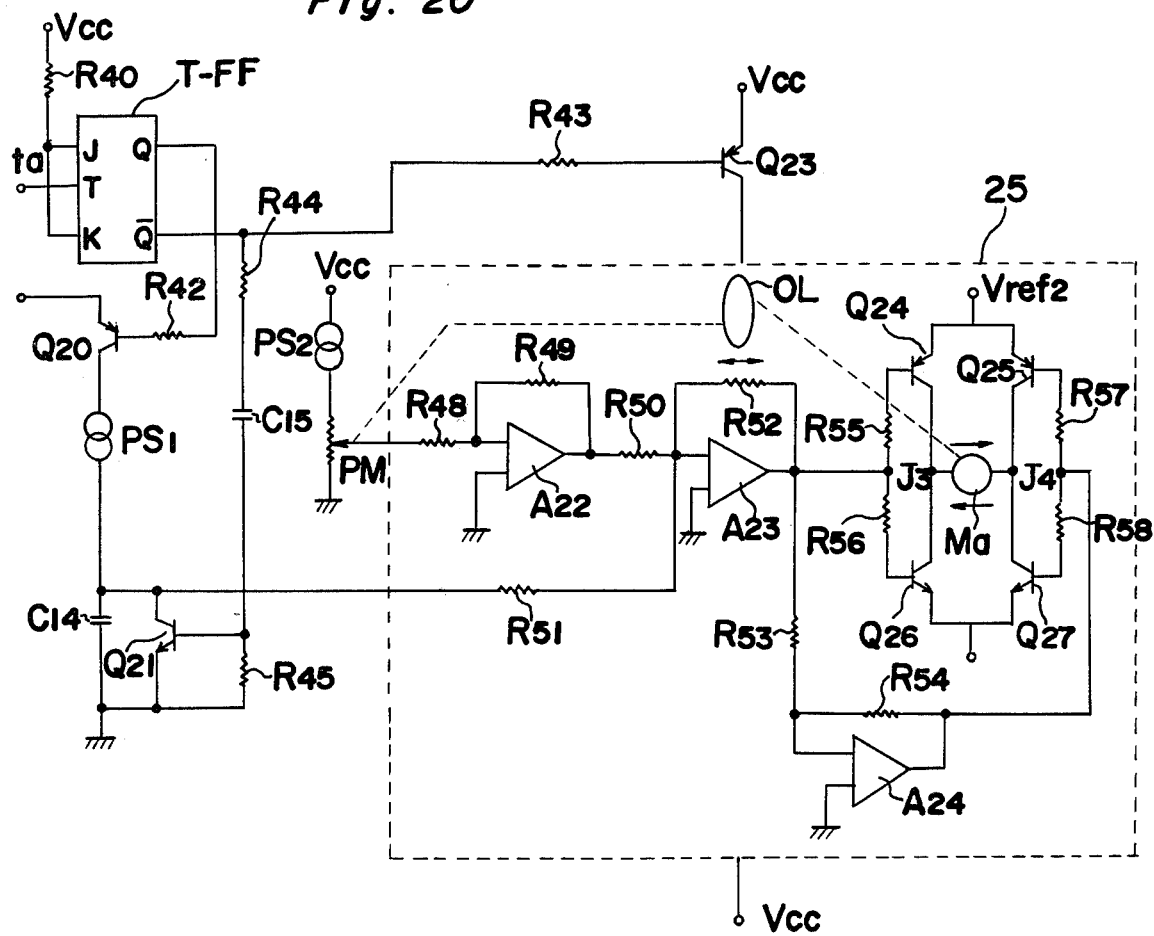
FIG. 20 is a diagram showing a modified form of the focus control circuit.

From the foregoing, it will be readily seen that, since the distance of the target object relative to the predetermined image forming plane and the position of the objective lens OL are alternately displayed by the light emitting diodes, the proper focus of the objective lens OL can be readily indicated to the operator if the objective lens OL is manually moved along its optical axis until one of the light emitting diodes becomes turned on constantly.

Where the automatic focus adjustment of the objective lens OL by means of a servo system, a focus control servo system is desired having the construction shown in FIG. 20 may be employed. The construction and operation of this servo system will now be described with particular reference to FIGS. 19 and 20.

Figure 18:
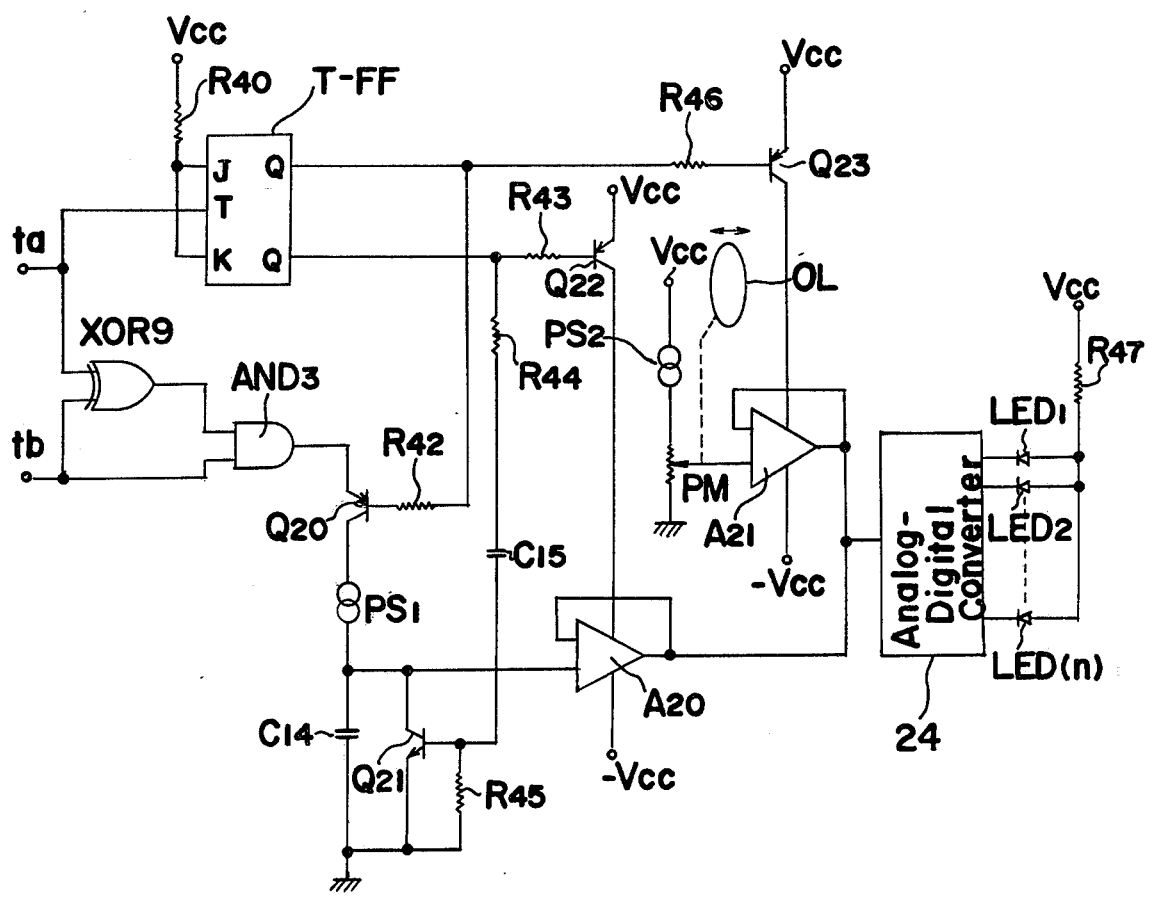
FIG. 18 is a diagram showing the focus control circuit employed in the rangefinder system shown in FIG. 16.

When the output state of the T-flip-flop T-FF also shown in FIG. 18 is reversed at the time T$_1$, the transistor Q21 instantaneously conducts and the capacitor C14 therefore discharges the voltage stored therein while the transistor Q23 becomes non-conductive, in the manner as hereinbefore described with reference to FIG. 18. In this condition, no power is supplied to the servo system enclosed by the broken line 25. However, when the output signal from the gate AND3 (FIG. 18) becomes a high level state at the time T$_2$, the capacitor C14 is charged from the constant current source PS1, this charging of capacitor C14 continuing until the output from the gate AND3 becomes a low level state at the time T$_3$. The amount of potential stored on the capacitor C14 corresponds to the distance of the target object relative to the predetermined image forming plane. At the time T$_4$, the output state of the T-flip-flop T-FF is reversed and the transistor Q23 accordingly becomes conductive whereby electric power is supplied to the servo system. The electric potential stored on the capacitor C14 representative of the distance of the target object relative to the predetermined image forming plane is then supplied to a subtraction circuit, composed of operational amplifiers A22 and A23 and resistors R48, R49, R50, R51 and R52. The an output of this subtraction circuit is connected to the base of transistor Q24 through resistor R55 and also to the base of transistor Q26 through resistor R56. The output of this subtraction circuit is also connected to an inverting amplifier circuit composed of an operational amplifier A24 and resistors R53 and R54. The output of this inverting amplifier is connected to the base of transistor Q25 through resistor R57 and also to the base of transistor Q27 through resistor R58.

The transistors Q24 and Q25 have their emitters connected in common to a positive reference voltage source Vref$_2$ while the emitters of the transistors Q26 and Q27 are connected in common to a common source of negative reference voltage source $-$Vref$_2$. The collector of the transistor Q24 is connected to the collector of the transistor Q26 and the collector of transistor Q25 is connected to the collector of transistor Q27. A servo motor Ma is connected between junction J3 of the collector of the transistor Q24 and the collector of the transistor Q26, and junction J4 of the collector of the transistors Q26 and the collector of the transistor Q27. In this arrangement, when the potential started on the capacitor C14 is higher than the potential across the variable resistor PM determined by the position of the movable tap, the collector current of the transistor Q24 becomes higher than that of the transistor Q26, but equal to that of the transistor Q27 and, therefore, current flows through the motor Ma in a direction from the junction J3 to the junction J4. Conversely, when the potential stored on the capacitor C14 is lower than the potential across the variable resistor PM determined by the position of the movable tap, current flows through the motor Ma from the junction J4 to the junction J3.

When the motor Ma is driven by the current flowing in the manner described above, the objective lens is repositioned along the optical axis thereof in search of the true focus setting. As the objective lens is moved in the manner described above, the movable tap of the variable resistor is correspondingly moved and, when the potential across the variable resistor determined by the setting of the movable tap becomes equal to the potential stored on the capacitor C14, the collector currents of all of the transistors Q24, Q25, Q26 and Q27 become equal to each other and, therefore, no current flows through the motor Ma. This means that, at the time of interruption of the supply of the current to the motor Ma, the objective lens OL is brought into proper focus. Where the objective lens OL is not brought into proper focus during the period ending at the time T$_5$, the foregoing operation is again repeated to drive the motor Ma so as to move the objective lens OL until the latter is brought into proper focus.

Figure 21:
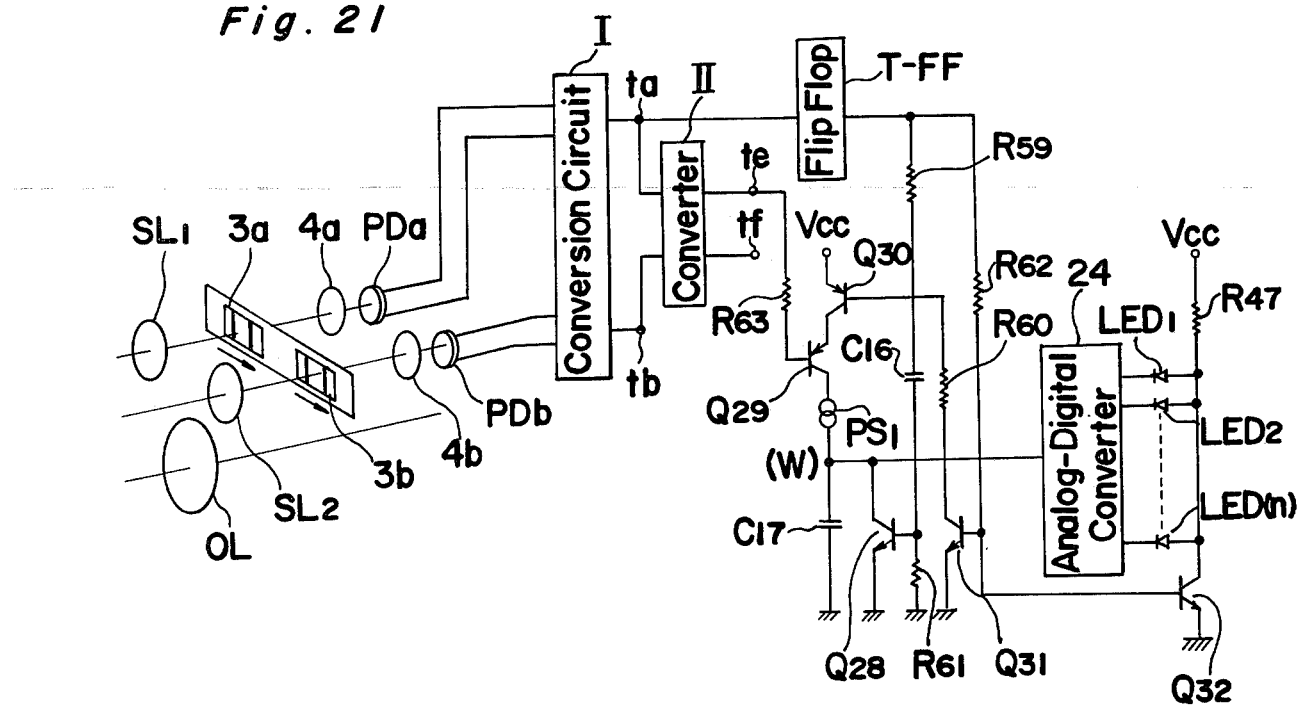
FIG. 21 is a schematic diagram showing a rangefinder system according to a further preferred embodiment of the present invention.

The circuit shown in FIG. 18 may be modified in the manner shown in FIG. 21. The modified circuit shown in FIG. 21 will now be described in terms of its operation with reference to FIG. 22. However, note that although the photoelectric receiver unit in FIG. 21 is shown as having photoresponsive elements PDa and PDb, the circuit shown in FIG. 21 can equally be applied to a rangefinder system in which the photoelectric receiver unit includes the photoresponsive elements PDa to PDd as shown in FIG. 16. Note further that element I is substantially identical to the conversion circuit having the construction shown in FIG. 9 and element II is substantially identical to the converter circuit having the construction shown in FIG. 13.

As hereinbefore described with reference to FIG. 9, the output signals of the respective waveforms (C) and (D) shown in FIG. 15 or FIG. 22 appear at the terminals ta and tb. These output signals from the conversion circuit I are supplied to the converter circuit II which generates, through the terminal te, the an output signal of having the waveform shown by (U) in FIG. 22. This converter circuit II also generates an electric output signal which is always in a high level state through the terminal tf.

Figure 22:
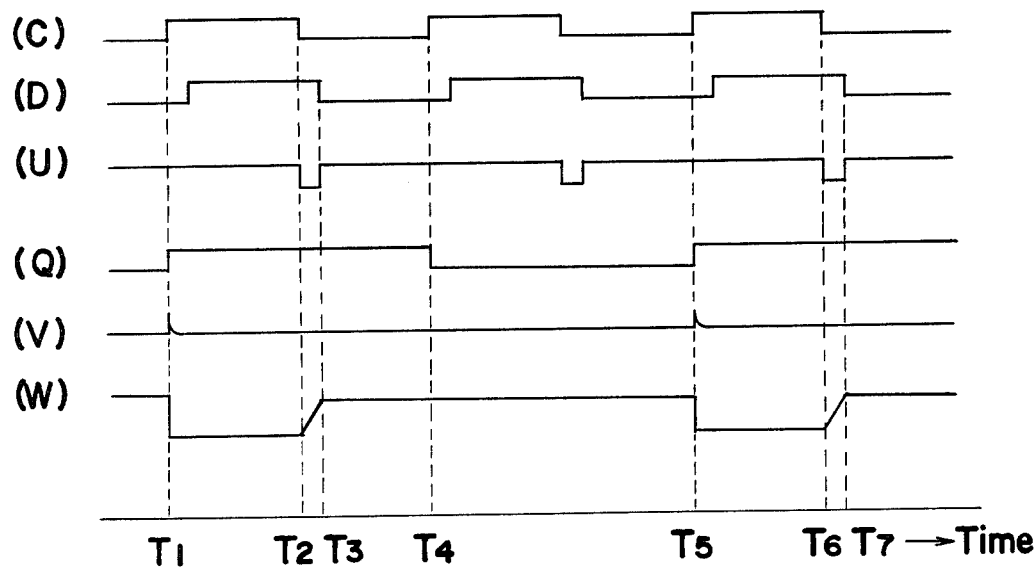
FIG. 22 is a chart showing waveforms of various signals appearing in the electric circuit of the rangefinder system shown in FIG. 21.

In this arrangement, when the output from the flip-flop T-FF is changed from a low level state to a high level state at the time $T_1$, a pulse having the waveform shown by (V) in FIG. 22 is generated from a differential circuit composed of capacitor C16 and resistor R59. This differentiated pulse is in turn applied to the base of transistor Q28 to cause transistor Q28 to conduct momentarily. Upon conduction of the transistor Q28, the potential stored on the capacitor C17 is discharged.

At the time $T_2$, transistor Q29 becomes conductive and, therefore, transistors Q30 and Q31 sequentially become conductive so that the capacitor C17 is charged from constant current source PS1. At the time $T_3$, the transistor Q29 becomes non-conductive and the supply of the current to the capacitor C17 is then interrupted to allow the capacitor C17 to retain the charge stored therein. At the time $T_4$, the potential applied to the bases of the transistors Q31 and Q32 becomes a low level state which lasts until the time $T_5$. Therefore, one of the light emitting diodes $LED_1$ to $LED_{(n)}$ corresponding to the potential stored in the capacitor C17 is turned on by the converter 24 in the manner described hereinbefore with reference to FIG. 18. Note that, during the period from the time $T_4$ to the time $T_5$, the transistors Q28 and Q31 are non-conductive and, therefore, the potential stored in the capacitor C17 does not vary.

In a manner similar to that hereinbefore described, the potential stored in the capacitor C17 is discharged through the transistor Q28 at the time $T_5$ and, the capacitor C17 is charged in an amount corresponding to the distance of the target object relative to the predetermined image forming plane during the period from the time $T_6$ to the time $T_7$ and, when the flip-flop T-FF reverses its output state, the transistor Q32 becomes non-conductive to turn on one of the light emitting diodes to show the operator the distance of the target object relative to the predetermined image forming plane. Note that, by comparing the charge stored in the capacitor C17 by the use of, for example, a comparison circuit, the deviation of the objective lens OL relative to the proper focus setting can be displayed. Note that the above described device for controlling the shift of the objective lens is not only connectable with the triangulation-type rangefinder described, but also with any other photoelectric rangefinder.

Although the present invention has fully been described in connection with the preferred embodiments thereof with reference to the accompanying drawings, note that various changes and modifications are apparent to those skilled in the art. By way of example, although the spatial filter 3 has been described as employing a liquid crystal as the electro-optical materials, other electro-optical material such as electrochromic material or PLZT may be employed.

Furthermore, the rangefinder system of the present invention can be applied not only to the photographic camera, but also to an electro-photographic copying machine, a microscope or any other optical instrument involving distance measurement.

We claim:

1. An apparatus for automatically focusing an image of a target object, comprising in combination:
   at least first and second photoresponsive element means, each for producing a photoresponsive signal indicative of the intensity of light received thereby;
   an optical system for transmitting rays of light carrying an image of the target object towards said at least first and second photoresponsive element means;
   a stationary spatial filter assembly disposed in the optical path between the target object and said at least first and second photoresponsive element means having an electrically controllable shiftable optical density distribution for electro-optically scanning said rays of light transmitted toward said at least first and second photoresponsive element means;
   a scanning means connected to said spatial filter assembly for electrically causing said optical density of said spatial filter assembly to scan at a predetermined rate;
   a detecting means connected to said first and second photoresponsive element means for detecting the difference in phase between said photoresponsive signals generated by said first and second photoresponsive element means; and
   a focusing signal generation means connected to said detecting means for generating a focusing signal utilizable for focusing the image of the target object.

2. An apparatus as claimed in claim 1, wherein said optical system includes a phototaking objective lens means, said first and second photoresponsive element means being positioned for receiving rays of light coming from the different portions of said phototaking objective lens means.

3. An apparatus as claimed in claim 2, wherein said spatial filter assembly comprises a single spatial filter positioned on the image forming plane of said phototaking objective lens means, and wherein said optical system further includes a relay lens means positioned between said phototaking objective lens means and said first and second photoresponsive element means, said first and second photoresponsive element means being disposed in the same plane perpendicular to the optical axis of said phototaking objective lens means, whereby their centers of responsivity have a symmetrical relation to each other with respect to the optical axis of said phototaking objective lens means, said first and second photoresponsive element means being further disposed in a side-by-side relation to each other in a direction parallel to the direction of scanning of said spatial filter.

4. An apparatus as claimed in claim 3, wherein said spatial filter comprises a common electrode, a plurality of groups of elongated electrodes equally spaced from each other in a direction parallel to the scanning direction of said spatial filter, a plurality of common terminals each connected to a corresponding group of elongated electrodes, an an electrooptical material between said common electrode and said elongated electrodes.

5. An apparatus as claimed in claim 4, wherein said optical density distribution of said spatial filter assembly varies in accordance with simple harmonic oscillation.

6. An apparatus as claimed in claim 3, further comprising a third photoresponsive element means positioned to receive rays of light transmitted through a predetermined portion of said phototaking objective lens means for producing a photoresponsive signal indicative of the intensity of light received thereby, a first arithmetic circuit means connected to said first and third photoresponsive element means for providing an output signal indicative of the difference or ratio between said photoresponsive signals from said first and third photoresponsive element means, and a second arithmetic circuit connected to said second and third photoresponsive element means for providing an output signal indicative of the difference or ratio between said photoresponsive signals from said second and third photoresponsive element means, wherein said detecting means is connected to said first and second arithmetic circuits and responsive to said output signals from said first and second arithmetic circuits for providing an output signal indicative of the difference in phase between said photoresponsive signals from said first and second arithmetic circuits.

7. An apparatus as claimed in claim 6, wherein said third photoresponsive element means is constituted by a single photoresponsive element.

8. An apparatus as claimed in claim 6, wherein said third photoresponsive element means is constituted by a pair of photoresponsive elements each for producing a photoresponsive signal indicative of the intensity of light received thereby, said photoresponsive elements of said pair being disposed in said plane of said first and second photoresponsive element means, whereby their centers of responsivity have a symmetrical relation to each other with respect to the optical axis of said phototaking objective lens means, said photoresponsive elements of said pair being further disposed in a side-by-side relation to each other in a direction perpendicular to the scanning direction of said spatial filter, and wherein said first arithmetic circuit provides said output signal indicative of the difference or ratio between said photoresponsive signal from said first photoresponsive element means and said photoresponsive signal from one of said photoresponsive elements of said pair while said second arithmetic circuit provides said output signal indicative of the difference or ratio between said photoresponsive signal from said second photoresponsive element means and said photoresponsive signal from the other of said photoresponsive elements of said pair.

9. An apparatus as claimed in claim 1, further comprising a phototaking objective lens means wherein said optical system comprises first and second stationary lens means of the same focal length disposed in the same plane perpendicular to the optical axis of said phototaking objective lens means in spaced relation to each other, and wherein said spatial filter assembly comprises first and second spatial filters positioned in respective image forming planes positioned in respective image forming planes of said first and second stationary lens means for receiving rays of light passing through said respective first and second stationary lens means, said first and second photoresponsive element means being positioned for receiving rays of light passing through said first and second spatial filters, respectively.

10. An apparatus as claimed in claim 9, wherein said first and second spatial filters scan at identical spatial frequencies in a phase-synchronized relationship with each other.

11. An apparatus as claimed in claim 10, wherein each of said first and second spatial filters comprises a common electrode, a plurality of groups of elongated electrodes equally spaced from each other in a direction parallel to the scanning direction of said spatial filter, a plurality of common terminals each connected to a corresponding group of elongated electrodes, and an electro-optical material between said common electrode and said elongated electrodes.

12. An apparatus as claimed in claim 11, wherein said optical density distribution of each of said first and second spatial filter assemblies varies in accordance with simple harmonic oscillation.

13. An apparatus as claimed in claim 9 further comprising:
a storing means connected to said focusing signal generation means for storing said focusing signal when said phototaking objective lens means is in an initial position;
a drive unit connected to said phototaking objective lens means for moving said phototaking objective lens means from said initial position;
a position detecting means connected to said phototaking objective lens means for generating a position signal indicative of the position of said phototaking objective lens means relative to said initial position; and
a comparison circuit connected to said storing means, said drive unit and said position detecting means for rendering said drive unit incapable of moving said phototaking objective lens means when said focusing signal stored in said storing means and said position signal have a predetermined relationship to each other.

14. An apparatus as claimed in claim 13, wherein the generation and the storing of said focusing signal, and the moving of said phototaking objective lens means are carried out in a sequentially timed relationship.

15. Apparatus as claimed in claim 9, further comprising a beam splitter means positioned between said first and second spatial filters and said first and second stationary lens means for dividing the rays of light passing through said first and second stationary lens means into two portions, one of said portions of the rays of light being directed through said first and second spatial filters towards said respective first and second photoresponsive element means, and further comprising third and fourth photoresponsive element means positioned to receive the other of said portions of the rays of light each for producing a photoresponsive signal indicative of the intensity of light received thereby, a first arithmetic circuit means connected to said first and third photoresponsive element means for providing an output signal indicative of the difference or ratio between said photoresponsive signals from said first and third photoresponsive element means, and a second arithmetic circuit connected to said second and fourth photoresponsive element means for providing an output signal indicative of the difference or ratio between said photoresponsive signals from said second and fourth photoresponsive element means, and wherein said detecting means is connected to said first and second arithmetic circuits and responsive to the output signals from said first and second arithmetic circuits for providing an output signal indicative of the difference in phase between said output signals from said first and second arithmetic circuits.

16. An apparatus as claimed in claim 9, further comprising storing means connected to said focusing signal generating means for storing said focusing signal therein, a position detecting means connected to said phototaking objective lens means for generating a position signal indicative of the position of said phototaking objective lens means, and a display means connected to said storing means and said position detecting means for displaying said focusing signal stored in said storing means and said position signal from said position detecting means one at a time in a sequentially timed relationship.

17. An apparatus as claimed in claim 2 further comprising:
- a storing means connected to said focusing signal generation means for storing said focusing signal when said phototaking objective lens means is in an initial position;
- a drive unit connected to said phototaking objective lens means for moving said phototaking objective lens means from said initial position;
- a position detecting means connected to said phototaking objective lens means for generating a position signal indicative of the position of said phototaking objective lens means relative to said initial position; and
- a comparison circuit connected to said storing means, said drive unit and said position detecting means for rendering said drive unit incapable of moving said phototaking objective lens means when said focusing signal stored in said storing means and said position signal have a predetermined relationship to each other.

18. An apparatus as claimed in claim 17, further comprising:
- a first gating circuit provided between said focusing signal generation means and said storing means for preventing application of said focusing signal to said storing means during the operation of said drive unit; and
- a second gating circuit provided between said drive unit and said comparison circuit for rendering said drive unit incapable of moving said phototaking objective lens means during the application of said focusing signal to said storing means.

19. An apparatus as claimed in claim 2, further comprising:
- a storing means connected to said focusing signal generation means for storing said focusing signal;
- a position detecting means connected to said phototaking objective lens means for generating a position signal indicative of the position of said phototaking objective lens means;
- a comparator connected to said storing means and said position detecting means for generating an output signal when said focusing signal stored in said storing means has a predetermined relationship with said position signal; and
- a display means connected to said storing means, said position detecting means and said comparator for displaying the focusing condition of said phototaking objective lens means according to the relationship between said focusing signal stored in said storing means and said position signal and for displaying when said comparator generates said output signal.

20. An apparatus for focusing an image of a target object, which comprises, in combination:
- a phototaking objective lens means movable for focusing an image of the target object on a main image forming plane;
- first and second stationary lens means having respective secondary image forming planes and having the same focal length, disposed in the same plane perpendicular to the optical axis of said phototaking objective lens means in spaced relation to each other;
- first and second spatial filters positioned on said respective secondary image forming planes of said first and second stationary lens means, for scanning ray of light passing therethrough;
- first and second photoresponsive element means positioned to receive rays of light passing through said first and second spatial filters, respectively, each for generating a photoresponsive signal indicative of the intensity of light received thereby;
- a beam splitter means positioned between said first and second spatial filters and said first and second stationary lens means for dividing the rays of light passing through said first and second stationary lens means into two portions, one of said portions of the rays of light being directed therethrough towards said first and second photoresponsive element means;
- third and fourth photoresponsive element means positoned to receive the other of said portions of the rays of light, each for generating a photoresponsive signal indicative of the intensity of light received thereby;
- a first arithmetic circuit means connected to said first and third photoresponsive element means for providing an output signal indicative of the difference or ratio between the output signals from said first and third photoresponsive element means;
- a second arithmetic circuit means connected to said second and fourth photoresponsive element means for providing an output signal indicative of the difference or ratio between the output signals from said second and fourth photoresponsive element means;
- a detector means connected to said first and second arithmetic circuit means for providing an output signal indicative of the difference in phase between said output signals from said first and second arithmetic circuit means; and
- a distance signal generating means connected to said detector means for generating a distance signal indicative of the distance of the target object relative to the main image forming plane.

21. An apparatus for automatically focusing an image of a target object, which comprises, in combination:
- a phototaking objective lens means movable for focusing an image of the target object on an image forming plane;
- a focus detecting means connected to said phototaking objective lens means for generating a focusing signal indicative of the degree and direction of the deviation of said phototaking objective lens means from the optimum position for focusing the image of the target object;
- a storing means connected to said focus detecting means for storing said focusing signal when said phototaking objective lens means is at an initial position;
- a drive unit connected to said phototaking objective lens means for moving said phototaking objective lens means;
- a position detecting means connected to said phototaking objective lens means for generating a position signal indicative of the relative displacement of said phototaking objective lens means from said initial position; and
- a comparison circuit connected to said position detecting means, said storing means and said drive unit for generating, an electric signal for placing the drive unit into an inoperative condition, when said focusing signal stored in said storing means and said position signal assume a predetermined relationship to each other.

22. An apparatus as claimed in claim 21, further comprising:
   a first gating circuit provided between said focusing signal generation means and said storing means for preventing application of said focusing signal to said storing means during the operation of said drive unit; and
   a second gating circuit provided between said drive unit and said comparison circuit for rendering said drive unit incapable of moving said phototaking objective lens means during the application of said focusing signal to said storing means.

23. An apparatus as claimed in claim 21, wherein said drive unit is respective to said focusing signal stored in said storing means.

24. An apparatus for automatically focusing an objective lens on a target object, which comprises, in combination:
   first and second stationary lens means of the same focal length disposed in the same plane perpendicular to the optical axis of the objective lens in spaced relation to each other;
   first and second spatial filters positioned on respective image forming planes of said first and second stationary lens means for scanning rays of light passing therefrom;
   first and second photoresponsive element means each for generating a photoresponsive signal indicative of the intensity of light received thereby positioned to receive rays of light passing through said first and second spatial filters, respectively, in alignment with said first and second stationary lens means;
   a scanning means connected to said first and second spatial filters for causing said first and second spatial filters to scan at a predetermined rate;
   a detecting means connected to said first and second photoresponsive element means for detecting the difference in phase between said photoresponsive signals generated by said first and second photoresponsive element means, respectively, which have resulted from rays of light reflected from different portions of the target object;
   a distance signal generating means connected to said detecting means for generating a distance signal indicative of the distance of the target object relative to said image forming planes;
   a storing means connected to said distance signal generating means for storing said distance signal;
   a drive unit for moving the objective lens from an initial position;
   a position detecting means for generating a position signal indicative of the relative displacement of the objective lens from said initial position; and
   a comparison circuit connected to said storing means and said position detecting means for generating an electric signal for placing drive unit in an inoperative condition, when said distance signal and said position signal assume a predetermined relation to each other.

25. An apparatus as claimed in claim 24, wherein the generation and the storing of said distance signal, and the moving of the objective lens are carried out in a sequentially timed relationship.

26. An apparatus for automatically focusing an image of a target object, which comprises, in combination;
   a phototaking objective lens means movable for focusing an image of the target object on an image forming plane;
   a distance detecting means for generating a distance signal indicative of the distance of the target object relative to the image forming plane;
   a storing means connected to said distance detecting means for storing said distance signal;
   a drive unit connected to said phototaking objective lens means for moving said phototaking objective lens means from an initial position;
   a position detecting means connected to said phototaking objective lens means for generating a position signal indicative of the relative displacement of said phototaking objective lens means from said initial position; and
   a comparison circuit connected to said storing means, said drive unit and said position detecting means for generating an electric signal for placing said drive unit in an inoperative condition, when said distance signal and position signal assume a predetermined relation to each other, said generation and the storing of said distance signal being carried out in a sequentially timed relationship to the moving of said phototaking objective lens means.

27. An apparatus as claimed in claim 26, wherein said drive unit is responsive to said distance signal stored in said storing means.

28. An apparatus for focusing an image of a target object, comprising, in combination:
   a phototaking objective lens means movable for focusing an image of the target on an image forming plane;
   a focus detecting means connected to said phototaking objective lens means for generating a focusing signal indicative of the degree and direction of the deviation of said phototaking objective lens means from the optimum position for focusing the image of the target object;
   a storing means connected to said focus detecting means for storing said focusing signal when said phototaking objective lens means is at an initial position;
   a position detecting means connected to said phototaking objective lens means for generating a position signal indicative of the relative displacement of said phototaking objective lens means from said initial position;
   a comparator connected to said storing means and said position detecting means for generating an output when said focusing signal stored in said storing means has a predetermined relationship with said position signal; and
   a display unit connected to said storing means, said position detecting means and said comparator for displaying the focusing condition of said phototaking objective lens means according to the relationship between said focusing signal stored in said storing means and said position signal and for displaying when said comparator generates said output signal.

29. An appartus for focusing an image of a target object, comprising, in combination:
   a phototaking objective lens means movable for focusing an image of the target object in a main image forming plane;

first and second stationary lens means having respective secondary image forming planes and having the same focal length, disposed in the same plane perpendicular to the optical axis of said phototaking objective lens means in a spaced relation to each other;

first and second spatial filters positioned on said respective secondary image forming planes of said first and second stationary lens means, for scanning rays of light passing therethrough;

first and second photoresponsive element means positioned for receiving rays of light passing through said first and second spatial filters, each for generating a photoresponsive signal indicative of the intensity of light received thereby;

a scanning means connected to said first and second spatial filters for causing said first and second spatial filters to scan at a predetermined rate;

a detecting means connected to said first and second photoresponsive element means for detecting the phase difference between said respective photoresponsive signals;

a distance signal generating means connected to said detecting means for generating a distance signal indicative of the distance of the target object relative to the main image forming plane;

a storing means connected to said distance signal generating means for storing said distance signal;

a position detecting means connected to said phototaking objective lens means for generating a position signal indicative of the position of said phototaking objective lens means; and a display means connected to said storing means and said position detecting means for displaying said distance signal stored in said storing means and said position signal one at a time in a sequentially time relationship.

30. An apparatus for focusing an image of a target object, which comprises, in combination;

a phototaking objective lens means movable for focusing an image of the target object on an image forming plane;

a distance detecting means for generating a distance signal indicative of the distance of the target object relative to the image forming plane;

a storing means connected to said distance detecting means for storing said distance signal from said distance detecting means;

a position detecting means connected to said phototaking objective lens means for generating a positon signal indicative of the position of said phototaking objective lens means; and a display means connected to said storing means and said position detecting means for displaying said distance signal stored in said storing means and said position signal from said position detecting means one at a time in a sequentially timed relationship.

* * * * *